United States Patent
Ito et al.

(10) Patent No.: US 11,492,015 B2
(45) Date of Patent: Nov. 8, 2022

(54) DRIVING ASSIST METHOD AND DRIVING ASSIST DEVICE

(71) Applicant: Nissan Motor Co., Ltd., Yokohama (JP)

(72) Inventors: Atsushi Ito, Kanagawa (JP); Shinya Saito, Kanagawa (JP); Shohei Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/605,592

(22) PCT Filed: May 15, 2019

(86) PCT No.: PCT/JP2019/019398
§ 371 (c)(1),
(2) Date: Oct. 22, 2021

(87) PCT Pub. No.: WO2020/230308
PCT Pub. Date: Nov. 19, 2020

(65) Prior Publication Data
US 2022/0266869 A1  Aug. 25, 2022

(51) Int. Cl.
*B60W 60/00*   (2020.01)
*B60W 30/12*   (2020.01)

(52) U.S. Cl.
CPC ........ *B60W 60/0055* (2020.02); *B60W 30/12* (2013.01); *B60W 60/0053* (2020.02); *B60W 2552/05* (2020.02); *B60W 2556/40* (2020.02); *B60W 2720/10* (2013.01)

(58) Field of Classification Search
CPC ............. B60W 30/12; B60W 2552/05; B60W 2556/40; B60W 2720/10
See application file for complete search history.

(56) References Cited

U.S. PATENT DOCUMENTS

| | | | |
|---|---|---|---|
| 2010/0082251 | A1 | 4/2010 | Kogure |
| 2014/0148988 | A1 | 5/2014 | Lathrop et al. |
| 2018/0072315 | A1 | 3/2018 | Enthaler et al. |
| 2019/0004514 | A1 | 1/2019 | Hiwatashi et al. |
| 2020/0239027 | A1* | 7/2020 | Watanabe ............ G05D 1/0088 |
| 2020/0264606 | A1* | 8/2020 | Kuwahara ......... B60W 60/0053 |

(Continued)

FOREIGN PATENT DOCUMENTS

| | | |
|---|---|---|
| CN | 102066185 A | 5/2011 |
| CN | 108327717 A | 7/2018 |
| CN | 108973993 A | 12/2018 |

(Continued)

*Primary Examiner* — Abby Y Lin
*Assistant Examiner* — Dylan M Katz
(74) *Attorney, Agent, or Firm* — Global IP Counselors, LLP

(57) ABSTRACT

A driving assist method and a driving assist device is provided for controlling a transmission ratio of a continuously variable transmission, which steplessly shifts gears and outputs an engine rotation speed. The driving assist method and a driving assist device continuously performs downshifting until an upshift occurs, when the transmission ratio of the continuously variable transmission is controlled so that the engine rotational speed increases in conjunction with an increase in a vehicle speed and the upshift will be performed after the vehicle has accelerated.

17 Claims, 10 Drawing Sheets

(56) References Cited

U.S. PATENT DOCUMENTS

2021/0146954 A1* 5/2021 Kaji .................... B60W 60/001

FOREIGN PATENT DOCUMENTS

| | | |
|---|---|---|
| DE | 10 2011 077 592 A1 | 7/2012 |
| FR | 3 038 280 A1 | 1/2017 |
| JP | H9-86223 A | 3/1997 |
| JP | 2017-159723 A | 9/2017 |
| JP | 2017-207885 A | 11/2017 |
| JP | 2018-203013 A | 12/2018 |
| JP | 2019-6275 A | 1/2019 |
| JP | 2019-10929 A | 1/2019 |

* cited by examiner

STEERING WHEEL OPERATION MODE M3

STEERING WHEEL ASSISTANCE DEACTIVATION MODE M4

DRIVING ASSIST METHOD AND DRIVING ASSIST DEVICE

CROSS-REFERENCE TO RELATED APPLICATIONS

This application is a U.S. national stage application of International Application No. PCT/JP2019/019398, filed on May 15, 2019.

BACKGROUND

Technical Field

The present disclosure relates to a driving assist method and a driving assist device.

Background Information

A conventional autonomous driving device is known in which audio information indicating "automatic steering will be deactivated, please be ready" is issued from a speaker when a switch from autonomous driving to driver-engaged driving occurs, and automatic steering is deactivated to entrust steering to the driver. If automatic steering is deactivated, next it is assessed whether or not a traveling deviation is within a permissible range. If, and only if, this assessment is "Yes," audio information indicating "automatic accelerator and automatic brake will be deactivated, please be ready" is issued, and an automatic accelerator and an automatic brake are deactivated to entrust the accelerator and the brake to the driver. Subsequently, display of "autonomous driving active" on a screen of a display device is discontinued (for instance, see Japanese Laid-open Patent Application No. H9-86223—Patent Citation 1).

SUMMARY

In a conventional device, automatic steering is first canceled and an automatic accelerator and an automatic brake are deactivated after a target segment has been passed through when a switch occurs from autonomous driving to driver-engaged driving. However, the problem has existed that, in driving assist control to assist driving operations by a driver, more reliable transfer from a system to the driver is demanded in association with advancements in driving assistance that raise the level of assistance of driving operations by the driver.

The present disclosure was created to address this problem, and the purpose thereof is to perform transfer from the system to the driver more reliably by lowering a level of driving assistance in a stepwise manner when it is known in advance that steering wheel assist will be deactivated in a travel scenario that involves a mode with a raised level of driving assistance.

In order to achieve this purpose, the present disclosure relates to a driving assist method that includes a vehicle speed/headway control function and a lane-keeping function as driving assist functions to assist driving operations by a driver, and that uses a mode transition controller for transitioning between driving assist modes. The driving assist method includes, as the driving assist modes, a hands-off mode in which the driver is allowed to take their hands off a steering wheel, a steering wheel grip mode that includes as a condition that the driver is holding the steering wheel with their hands, and a steering wheel assist deactivation mode in which the lane-keeping function is deactivated. A lane disappearance region, in which no lane that continues from a current lane can be recognized, is detected along an extension of a travel route of a host vehicle during lane-keeping travel in which the hands-off mode has been selected. When the lane disappearance region is detected, information on a lane disappearance start point is acquired, and a mode transition position is set between a host vehicle position and the lane disappearance start point. When the host vehicle reaches the mode transition position, a mode transition from the hands-off mode to the steering wheel grip mode is requested. When gripping of the steering wheel by the driver has been confirmed, a mode transition is performed from the steering wheel grip mode to the steering wheel assist deactivation mode before the host vehicle reaches the lane disappearance start point.

Because the means for solving the problem described above is employed, it is possible to perform transfer from the system to the driver more reliably by lowering a level of driving assistance in a stepwise manner when it is known in advance that steering wheel assist will be deactivated in a travel scenario involving a mode with a raised level of driving assistance.

BRIEF DESCRIPTION OF THE DRAWINGS

Referring now to the attached drawings which form a part of this original disclosure.

DETAILED DESCRIPTION OF EMBODIMENTS

Figure 1:
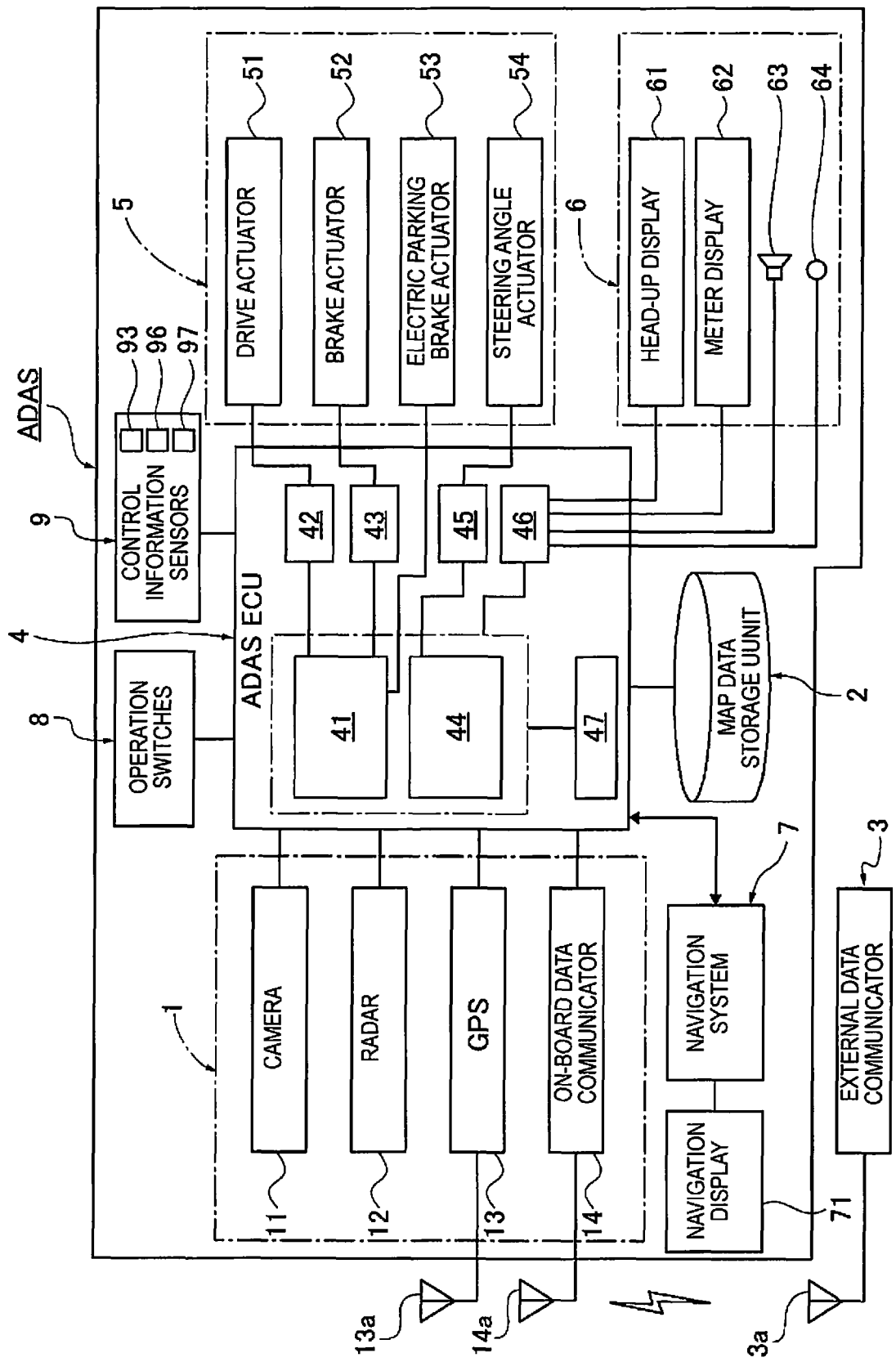
FIG. 1 is an overall system diagram showing an advanced driver assist system to which a driving assist method and a driving assist device of the first embodiment have been applied.

A mode for carrying out a driving assist method and a driving assist device according to the present disclosure will be described below based on the first embodiment, shown in the drawings.

First Embodiment

The driving assist method and the driving assist device in a first embodiment have been applied to a driving-assisted vehicle in which has been installed an advanced driver assist system (ADAS) that assists driving operations by a driver. The configuration of the first embodiment will be divided into "overall system configuration," "configuration of the control block of the mode transition controller," and "configuration of the control process for switching the driving assist mode" for description.

Overall System Configuration

Figure 2:
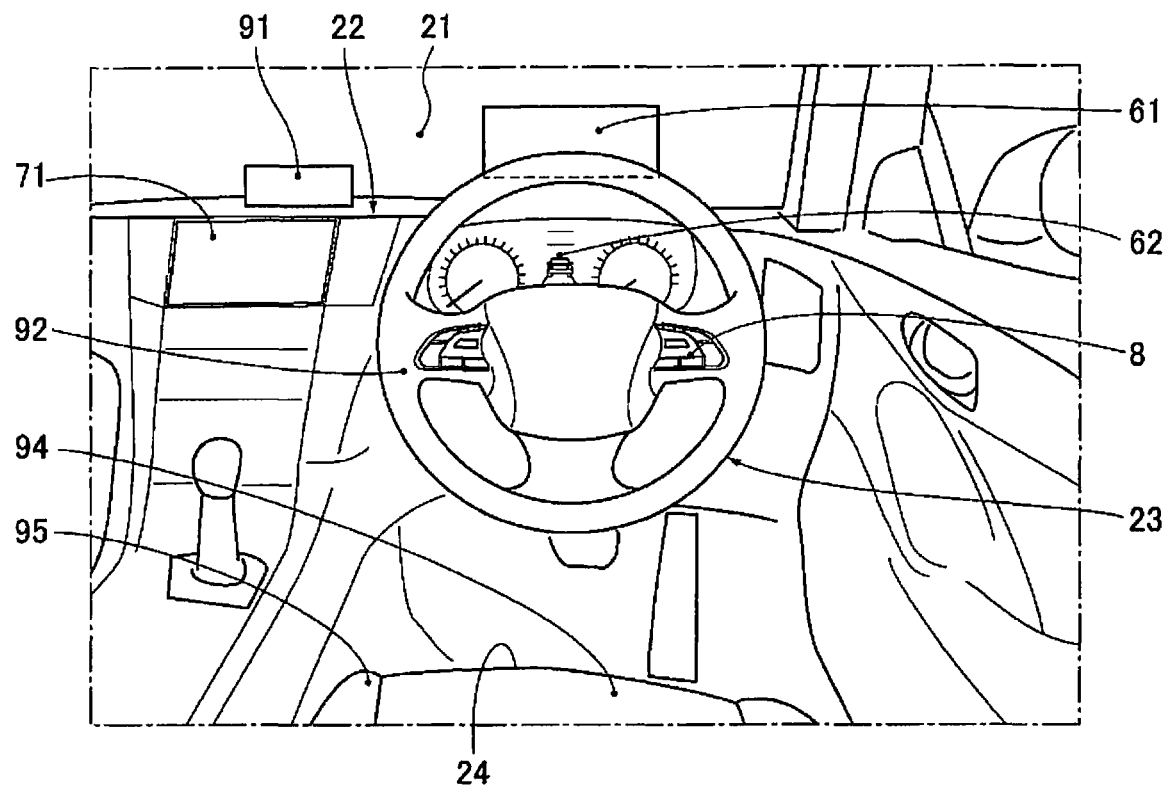
FIG. 2 is a diagram showing a vehicle interior configuration when a windshield is viewed from a driver's seat position in a driving-assisted vehicle.
Figure 3:
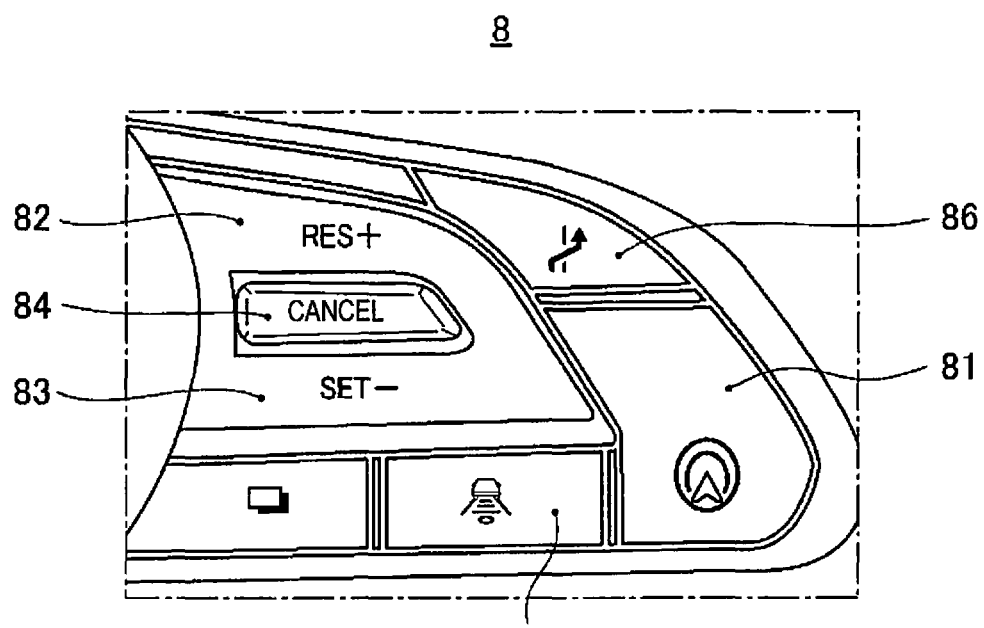
FIG. 3 is an enlarged view showing driver-operated switches that are provided on a steering wheel of the driving-assisted vehicle.

FIG. 1 shows the advanced driver assist system to which the driving assist method and the driving assist device of the first embodiment have been applied. FIG. 2 shows a vehicle interior configuration when a windshield is viewed from a driver's seat position in the driving-assisted vehicle. FIG. 3 shows driver-operated operation switches provided on a steering wheel of the driving-assisted vehicle. The overall system configuration will be described below based on FIGS. 1-3.

The advanced driver assist system (ADAS) is a system that includes a vehicle speed/headway control function, a lane-keeping function, and a route travel assist function. As shown in FIG. 1, the ADAS is provided with on-board sensors 1, a map data storage unit 2, an external data communicator 3, an ADAS control unit 4, an actuator 5, an HMI device 6, a navigation system 7, operation switches 8, and control information sensors 9. "HMI" is an abbreviation for "humanmachine interface."

The on-board sensors 1 have a camera 11, a radar 12, a GPS 13, and an on-board data communicator 14. Sensor information acquired by the on-board sensors 1 is output to the ADAS control unit 4.

The camera 11 is a host vehicle surroundings recognition sensor that fulfills a function of acquiring information on host vehicle surroundings, such as a current lane, neighboring lanes, vehicles surrounding the host vehicle, and pedestrians around the host vehicle, from image data. The camera 11 combines a forward recognition camera, a rearward recognition camera, a rightward recognition camera, a leftward recognition camera, and the like, and is configured so as to have an Around View Monitor function. Objects in a host vehicle travel path, lanes, objects outside the host vehicle travel path (roadway structures, preceding vehicles, trailing vehicles, oncoming vehicles, surrounding vehicles, pedestrians, bicycles, and motorcycles), the host vehicle travel path (roadway white lines, roadway boundaries, stop lines, and pedestrian crossings), traffic signs (speed limits), and the like are sensed by this camera 11.

The radar 12 is a ranging sensor that fulfills a function of sensing whether or not objects are present in the host vehicle surroundings and a function of sensing a distance to an object in the host vehicle surroundings. Here "radar 12" is a general term that encompasses radar, which uses radio waves; lidar, which uses light; and sonar, which uses ultrasonic waves. The positions of objects in the host vehicle travel path, objects outside the host vehicle travel path (roadway structures, preceding vehicles, trailing vehicles, oncoming vehicles, surrounding vehicles, pedestrians, bicycles, and motorcycles), and the like, along with the distances to the objects, are sensed by this radar 12.

The GPS 13 includes a GNSS antenna and is a host vehicle position sensor that senses the position (latitude and longitude) of a stopped or traveling host vehicle through the use of satellite communication. "GNSS" is an abbreviation for "global navigation satellite system," and "GPS" is an abbreviation for "Global Positioning System."

The on-board data communicator 14 is an external data sensor with which information that cannot be acquired by the on-board sensors 1 or from map data is acquired from outside through wireless communication with an external data communicator 3 via transceiving antennas 3a, 14a. Here, if the "external data communicator 3" is, for instance, a data communicator installed in another vehicle traveling near the host vehicle, vehicle-to-vehicle communication can be carried out between the host vehicle and the other vehicle, and information required by the host vehicle can be acquired through requests from the variety of information held by the other vehicle. Moreover, if the "external data communicator 3" is, for instance, a data communicator provided in an infrastructure facility, infrastructure communication can be carried out between the host vehicle and the infrastructure facility, and information required by the host vehicle can be acquired through requests. For instance, if there is information missing from map data saved in the map data storage unit 2 or information that has been changed from the map data, the missing or changed information can be supplemented. It is also possible to acquire traffic information such as information on traffic jams on a travel route of the host vehicle, or travel regulation information.

The map data storage unit 2 is configured from on-board memory in which is stored so-called electronic map data, in which latitude/longitude and map information are associated. The map data stored in the map data storage unit 2 is high-accuracy map data with accuracy of a level that fundamentally allows recognition of lanes, with the exception of geographical areas for which there is no high-accuracy map data. When the position of the host vehicle sensed by the GPS 13 is recognized by the ADAS control unit 4, the high-accuracy map data for a prescribed range centered on the position of the host vehicle is sent to the ADAS control unit 4 and the navigation system 7.

Here, "high-accuracy map data" has roadway information associated with geographic points, and the roadway information is defined by nodes and links that connect the nodes. The roadway information includes information that specifies roadways by the positions or regions of the roadways and information on roadway types of each roadway, lane widths of each roadway, and shapes of roadways. The roadway information is stored so that positions of intersections, entry directions of intersections, types of intersections, and other information relating to intersections are associated with each set of identifying information on roadway links. Moreover, the roadway information is stored so that roadway types, lane widths, roadway shapes, whether or not straight driving is possible, advancement precedence relationships, whether or not passing is possible (whether or not neighboring lanes can be entered), speed limits, signs, and other information relating to roadways are associated with each set of identifying information on roadway links.

The ADAS control unit 4 is a unit that integrates driving assist control, and has an accelerator/brake assist controller 41, a travel drive source controller 42, and a brake controller 43 as controllers that share the vehicle speed/headway control function. The ADAS control unit 4 also has a steering wheel assist controller 44 and a steering controller

45 as controllers that share the lane-keeping function. Furthermore, in the case of the advanced driver assist system (ADAS), the ADAS control unit 4 has an HMI controller 46 as a controller that shares the function of providing communication between the driver and the system. In addition, in the case of the advanced driver assist system (ADAS), the ADAS control unit 4 has a mode transition controller 47 that controls switching of driving assist modes in conjunction with the raising of a level of driving assistance to a driving assist mode based on the driver having their hands off the steering wheel.

The accelerator/brake assist controller 41 performs the following control to assist accelerator operation and brake operation by the driver.

(a) When a preceding vehicle is detected, headway is controlled so that a vehicle speed set by the driver is taken as an upper limit and a headway distance corresponding to the vehicle speed is maintained.

(b) If no preceding vehicle is detected, the vehicle travels steadily at the set vehicle speed.

(c) When the preceding vehicle has stopped, the host vehicle is also stopped after the preceding vehicle.

(d) When the stopped preceding vehicle has advanced, the stopped state is released and following-travel is resumed if a resume/accelerate switch 82 (see FIG. 3) is pressed or an accelerator pedal is depressed.

(e) When the host vehicle has stopped under the vehicle speed/headway control function, an electric parking brake is activated by a command to an electric parking brake actuator 53 if a system release operation is performed.

In addition to the vehicle speed/headway control based on (a)-(e) above, generally known as "cruise control," the accelerator/brake assist controller 41 performs the control described below.

(f) When the host vehicle is traveling under the vehicle speed/headway control function, alteration (raising or lowering) of the set vehicle speed through operation of switches by the driver is permitted.

(g) If a new speed limit has been detected by a speed limit sign sensing function, a speed limit assist display blinks, "the set vehicle speed has been altered" is displayed on a display, and the set vehicle speed is made to reflect the detected speed limit. However, the speed limit is not reflected in the set speed in cases in which the set vehicle speed has been set to a speed higher than the speed limit through operation of switches by the driver and then the set vehicle speed is not exceeded, even if the speed limit has risen (speed limit assist).

(h) When the host vehicle is traveling under the vehicle speed/headway control function, acceleration is allowed if the accelerator pedal is depressed when the driver wishes to accelerate temporarily. Brake control, proximity warnings, and curve warnings are not issued when the accelerator pedal is being operated and acceleration is occurring. If the accelerator pedal is released, the previous vehicle speed/headway control is restored.

(i) When the host vehicle is traveling under the vehicle speed/headway control function, deceleration is allowed if the brake pedal is depressed when the driver wishes to decelerate temporarily. When the driver wishes to reset to the set vehicle speed that was in effect prior to deceleration, the resume/accelerate switch 82 (see FIG. 3) is pressed.

(j) When a curved road is being traveled, vehicle speed is controlled so that the vehicle can travel at a vehicle speed corresponding to the size of curves ahead based on the map information (curve-coordinated deceleration). This curve-coordinated deceleration function is a function that uses curvature information acquired from high-accuracy map data or a navigation system, and determines an upper limit for a target speed so that lateral acceleration will be at or below a prescribed value. Specifically, the curve-coordinated deceleration function performs back-calculation based on the curvature and the position of the curve so that lateral acceleration will be at or below the prescribed value to start deceleration ahead of the curve, and the vehicle travels in a state in which deceleration on each roadway has been completed. At this time, a target acceleration for the curve-coordinated deceleration in a "steering wheel operation mode" is made to be lower than the target acceleration for the curve-coordinated deceleration in a "hands-on mode," a "hands-off mode," and a "steering wheel assist deactivation mode."

If a target vehicle speed is generated by the accelerator/brake assist controller 41, the travel drive source controller 42 performs longitudinal control in which a drive command value is computed and output to a drive actuator 51 so that an actual vehicle speed of the host vehicle will reach the target vehicle speed.

If a target braking deceleration is generated by the accelerator/brake assist controller 41, the brake controller 43 performs longitudinal control in which a braking command value is computed and output to the brake actuator 52 so that an actual braking deceleration of the host vehicle will reach the target braking deceleration.

The steering wheel assist controller 44 exercises the lane-keeping function, in which steering control (lateral control) is performed and steering operation of the driver is assisted so that the host vehicle travels in a central section of the lane based on detection of lane markers on both sides of the lane by the forward recognition camera. This steering wheel assist controller 44 has, in addition to the lane-keeping function, a route travel assist function that includes as a condition that lane-keeping travel is being performed along a travel route generated in advance if the driver has set a destination in coordination with the navigation system 7. If a lane change start point necessary for travel along the travel route is reached, the route travel assist function uses display to confirm with the driver whether a lane change will be performed and, in a case in which the driver has performed a switch operation, assists with the lane change through steering control.

If a target steering angle is generated by the steering wheel assist controller 44 for the host vehicle to travel the central section of the lane, the steering controller 45 performs lateral control in which a steering angle command value is computed and output to a steering angle actuator 54 so that an actual steering angle of the host vehicle will reach the target steering angle.

The HMI controller 46 generates a display command to a head-up display 61 and a meter display 62 so that working states of the vehicle speed/headway control function and the lane-keeping function, and changes in these working states, can be recognized visually. For instance, when "hands-off mode," "hands-on mode," "steering wheel operation mode," and "steering wheel assist deactivation mode" are to be displayed, a display differentiating modes by color, an icon display, or a message display are utilized so that the driver can ascertain the working state at a glance. Moreover, an audio signal to a speaker 63 is generated when an announcement to the driver that appeals to the auditory sense becomes necessary, and an activation/stop command for an alarm 64 is generated when a warning to the driver that appeals to the auditory sense becomes necessary.

Here, the head-up display 61 of the HMI device 6 is set at a lower position in the windshield 21, as shown in FIG. 2, and the head-up display 61 displays system states and the like on the windshield using a lamplight apparatus. The meter display 62 is set in a gauge display unit of an instrument panel 22 and displays system working states, nearby vehicle states, and the like. The speaker 63 and the alarm 64 are set at prescribed positions on the inner side of a panel of the instrument panel 22.

During lane-keeping travel in which the hands-off mode has been selected, the mode transition controller 47 can detect a lane disappearance region, in which no lane that continues from the current lane can be recognized, along an extension of the travel route of the host vehicle. If the lane disappearance region is detected, information on a lane disappearance start point is acquired, and a first position and a second position are set between a host vehicle position and the lane disappearance start point. If the host vehicle reaches the first position, a mode transition from the hands-off mode to the hands-on mode is requested. If the host vehicle reaches the second position, a mode transition from the hands-on mode to the steering wheel operation mode is requested. If gripping of the steering wheel by the driver has been confirmed, a mode transition is performed from the steering wheel operation mode to the steering wheel assist deactivation mode before the host vehicle reaches the lane disappearance start point.

Here, "hands-off mode" denotes a driving assist mode that allows the driver to remove their hands from the steering wheel 23. "Hands-on mode" denotes a driving assist mode that includes as a condition that the driver has their hands on the steering wheel 23. "Steering wheel operation mode" denotes a driving assist mode that encourages the driver to operate the steering wheel. "Steering wheel assist deactivation mode" denotes a driving assist mode in which the lane-keeping function is deactivated. That is, "hands-off mode," "hands-on mode," and "steering wheel operation mode" are modes that differ only in being a mode in which the driver is allowed to take their hands off the steering wheel 23, a mode in which the driver is required to have their hands on the steering wheel 23, or a mode in which the driver is required to operate the steering wheel 23 with their hands, and are not modes in which the driving assist control is changed. On the other hand, "steering wheel assist deactivation mode" is a mode in which the lane-keeping function of the steering wheel assist controller 44 is deactivated, while the vehicle speed/headway control function of the accelerator/brake assist controller 41 is maintained. In other words, "steering wheel assist deactivation mode" is a mode in which steering wheel operation is transferred from the system to the driver.

The navigation system 7 combines map data stored in the map data storage unit 2 with the GPS 13, which uses satellite communication, and, if a destination is set, generates a travel route from the current position of the host vehicle to the destination and navigates the host vehicle to the destination. When the travel route is generated, a roadway map screen is displayed together with the travel route and a host vehicle icon on a navigation display 71. The navigation display 71 is disposed in an upper central position in the instrument panel 22, as shown in FIG. 2, and has a function for setting the destination through touch operations or the like by the driver.

As shown in FIG. 2, the operation switches 8 are set at a position on a steering hub that links a steering wheel rim and a steering wheel shaft of the steering wheel 23, where they can be finger-operated while the driver is still holding the steering wheel rim. The operation switches 8 have a main switch 81, a resume/accelerate switch 82, a set/coast switch 83, a cancel switch 84, a headway adjustment switch 85, and a lane-change assist switch 86. The main switch 81 is a switch for powering the system on or off. The resume/accelerate switch 82 has a function for reactivation following deactivation at the set vehicle speed that was in effect before deactivation, a function for raising the set vehicle speed, and a function for resuming advancement after the host vehicle has stopped so as to follow a preceding vehicle. The set/coast switch 83 has a function for activation at a traveling vehicle speed and a function for lowering the set vehicle speed. The cancel switch 84 is a switch that cancels activation. The headway adjustment switch 85 is a switch that toggles between established headway settings. The lane-change assist switch 86 is a switch that issues an instruction for a lane change to be started when the system has confirmed the start of a lane change with the driver.

Here, after the main switch 81 has been pressed, if the vehicle accelerates or decelerates to a desired set vehicle speed and the set/coast switch 83 is pressed, the speed limit of the roadway being traveled is used as the set vehicle speed, and driving assist control by the ADAS control unit 4 is activated. If no speed limit has been detected for the roadway being traveled, or if speed limit assist has been turned off, the speed when the set/coast switch 83 was pressed will be used as the set vehicle speed, and driving assist control by the ADAS control unit 4 is activated.

Driving assist control by the ADAS control unit 4 is deactivated when the cancel switch 84 is pressed, when the main switch 81 is pressed, or when the brake pedal is depressed (unless the host vehicle has been stopped by the vehicle speed/headway control function).

The control information sensors 9 acquire information necessary to the execution of driving assist control by the ADAS control unit 4. As shown in FIG. 2, the control information sensors 9 have a driver monitor camera 91, a touch sensor 92, a seating sensor 94, and a seatbelt buckle switch 95. In addition, as shown in FIG. 1, the control information sensors have a torque sensor 93, a vehicle speed sensor 96, and an accelerator position sensor 97.

The driver monitor camera 91 is set so that a camera lens faces the driver, and monitors the forward gaze of the driver (facial orientation and whether their eyes are open or closed). The touch sensor 92 (a capacitive sensor) is set in the steering wheel rim of the steering wheel 23, which is where the driver places their hands, and detects whether the driver has their hands on the steering wheel 23. The torque sensor 93 is installed in a steering force transmission unit of a steering mechanism, and detects whether a driver is adding steering torque to operate the steering wheel. The seating sensor 94 (a weight sensor) is set in a seat cushion 24 of a driver's seat, and detects whether the driver is seated. The seatbelt buckle switch 95 detects whether a seatbelt is locked. The vehicle speed sensor 96 detects the actual vehicle speed of the host vehicle. The accelerator position sensor 97 detects an accelerator depression when an accelerator operation has been performed by the driver.

Configuration of the Control Block of the Mode Transition Controller

The configuration of a control block of the mode transition controller 47 is described below, based on FIG. 4, which shows the mode transition controller 47 of the ADAS control unit 4.

Figure 4:
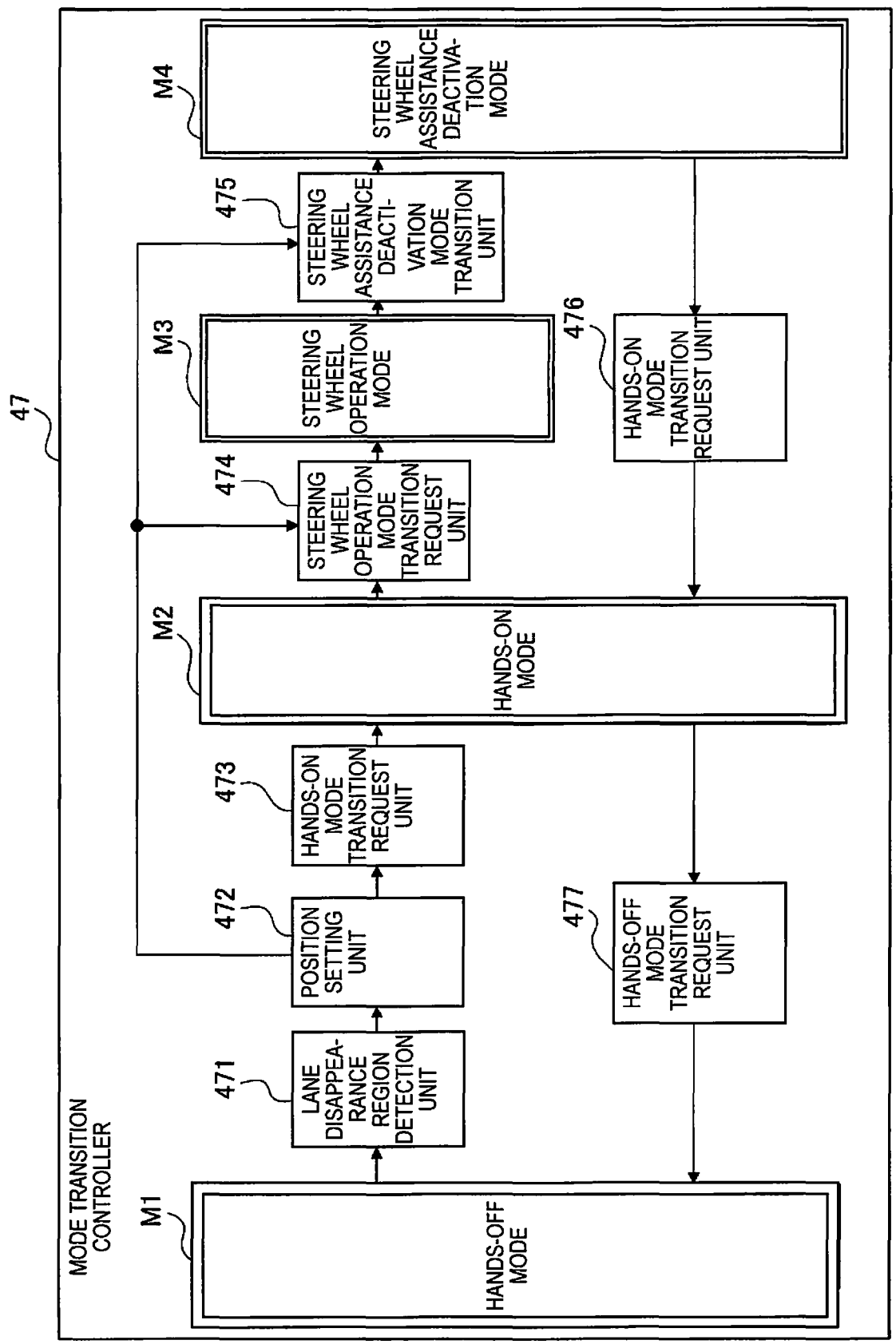
FIG. 4 is a control block diagram showing the configuration of a mode transition controller of an ADAS control unit.

As shown in FIG. 4, the mode transition controller 47 has a lane disappearance region detection unit 471, a position setting unit 472, a hands-on mode transition request unit 473, a steering wheel operation mode transition request unit 474, and a steering wheel assist deactivation mode transition unit 475. The mode transition controller 47 also has a hands-on mode transition request unit 476 and a hands-off mode transition unit 477.

The lane disappearance region detection unit 471 detects a lane disappearance region, in which no lane that continues from a current lane can be recognized, along an extension of the travel route of the host vehicle during lane-keeping travel in which "hands-off mode M1" has been selected. Here, "lane disappearance region" denotes, inter alia, the following locations.

(a) Exits: Locations where there is no map data based on information such as lane attributes, center lines, etc. Specifically, this term denotes highway exits, service areas, parking areas, etc.

(b) Toll plazas: Locations where there is map data and there is information indicating that there are no lanes.

(c) Laneless segments (laneless increase, laneless decrease): Locations where there is map data and there is information indicating that there are no lanes.

(d) Merges: Locations where there is map data and there is information indicating that the current lane will disappear due to merging.

(e) Lane decreases: Locations where there is map data and there is information indicating the current lane will disappear due to a reduction in lanes.

If the lane disappearance region is detected, the position setting unit 472 acquires information on the lane disappearance start point and sets a first position (a position close to the host vehicle) and a second position (a position far from the host vehicle) between the host vehicle position and the lane disappearance start point.

If the host vehicle reaches the first position, the hands-on mode transition request unit 473 requests a mode transition from "hands-off mode M1" to "hands-on mode M2." Here, the setting of the first position differs depending on whether the roadway does not require the host vehicle to change lanes or the roadway does require a lane change.

The request for the mode transition to "hands-on mode M2" is performed by changing display by color differentiation, icons, and message on the displays 61, 62 and by announcing "please hold the steering wheel." The mode transition to "hands-on mode M2" is confirmed by monitoring a sensor signal from the touch sensor 92. Furthermore, regardless of the request for the mode transition to "hands-on mode M2," if it is not possible to detect that the driver is holding the steering wheel within a prescribed length of time, the action (longitudinal control+lateral control) of the driving assist control is deactivated after the host vehicle has been decelerated and stopped.

If the host vehicle reaches the second position, the steering wheel operation mode transition request unit 474 requests a mode transition from "hands-on mode M2" to "steering wheel operation mode M3." Here, when setting the second position, the origin point for positioning distance is caused to vary depending on whether or not a curve with a prescribed turning radius or less is present ahead of the lane disappearance region.

The request for the mode transition to "steering wheel operation mode M3" is performed by changing the display of color differentiation, icons, and message on the displays 61, 62 and by announcing "please operate." The mode transition to "steering wheel operation mode M3" is confirmed by monitoring a sensor signal from the torque sensor 93. Furthermore, regardless of the request for the mode transition to "steering wheel operation mode M3," if it is not possible to detect steering wheel operation of the driver even after waiting a prescribed length of time, the action (longitudinal control+lateral control) of the driving assist control itself is deactivated after the host vehicle has been decelerated and stopped.

If the host vehicle reaches the lane disappearance start point, the steering wheel assist deactivation mode transition unit 475 performs a mode transition from "steering wheel operation mode M3" to "steering wheel assist deactivation mode M4." If a mode transition to "steering wheel assist deactivation mode M4" occurs, the display of color differentiation, icons, and messages on the displays 61, 62 is changed. The same condition of reaching the lane disappearance start point is applied as a condition for the mode transition to "steering wheel assist deactivation mode M4," regardless of the setting of the first position and the second position.

With regard to the hands-on mode transition request unit 476, the host vehicle, with "steering wheel assist deactivation mode M4" selected, passes through the lane disappearance region to reach a lane disappearance end point, and lane recognition is resumed. Because starting lateral control to assist with steering wheel operation of the driver has become possible due to the resumption of lane recognition, a mode transition is made from "steering wheel assist deactivation mode M4" to "hands-on mode M2." Here, the mode transition to "hands-on mode M2" is performed by starting lateral control and by changing display of color differentiation, icons, and messages on the displays 61, 62. When "steering wheel assist deactivation mode M4" has been selected, the driver is holding the steering wheel to perform steering operations. Thus, the mode transition from "steering wheel assist deactivation mode M4" to "steering wheel operation mode M3" is omitted.

When hands-off mode selection conditions are met during lane-keeping travel in "hands-on mode M2," the hands-off mode transition unit 477 performs a mode transition from "hands-on mode M2" to "hands-off mode M1." Here, the mode transition to "hands-off mode M1," in which hands can be off the steering wheel, is performed by changing display of color differentiation, icons, and messages on the displays 61, 62. Multiple conditions are imposed as hands-off conditions for selecting "hands-off mode M1," for instance, "the vehicle is traveling at a vehicle speed at or below the speed limit," "the driver is holding the steering wheel 23," "the accelerator pedal is not depressed," and the like.

Configuration of the Control Process for Switching Driving Assist Modes

Below, the step-by-step configuration of control for switching driving assist modes will be explained based on FIG. 5, which shows the flow of a control process for switching the driving assist modes that is executed by the mode transition controller 47 provided in the ADAS control unit 4. This process is started by the activation of driving assist control, and ends if driving assist control is deactivated.

In step S1, following the start or a determination in S6 that deactivation conditions for driving assist control have not been met, a determination is made as to whether or not the driving assist mode is "steering wheel assist deactivation mode M4." In the case of YES (the mode is "steering wheel assist deactivation mode M4"), the process proceeds to step S32, and in the case of NO (the mode is not "steering wheel assist deactivation mode M4"), the process proceeds to step S2.

In step S2, following a determination in S1 that the mode is not "steering wheel assist deactivation mode M4," a determination is made as to whether or not the driving assist mode is "hands-off mode M1." In the case of YES (the mode is "hands-off mode M1"), the process proceeds to step S7, and in the case of NO (the mode is not "hands-off mode M1"), the process proceeds to step S3.

In step S3, following a determination in S2 that the mode is not "hands-off mode M1," a determination is made as to whether or not the driving assist mode is "hands-on mode M2." In the case of YES (the mode is "hands-on mode M2"), the process proceeds to step S4, and in the case of NO (the mode is not "hands-on mode M2"), the process proceeds to step S6.

In step S4, following a determination in S3 that the mode is "hands-on mode M2," a determination is made as to whether or not hands-off conditions for switching from "hands-on mode M2" to "hands-off mode M1" have been met. In the case of YES (hands-off conditions have been met), the process proceeds to step S5, and in the case of NO (hands-off conditions have not been met), the process proceeds to step S6.

In step S5, following a determination in S4 that the hands-off conditions have been met, a mode transition is performed from "hands-on mode M2" to "hands-off mode M1," and the process proceeds to step S6.

In step S6, following a mode transition to "hands-off mode M1" in S5, a mode transition to "hands-on mode M2" in S34, a mode transition to "steering wheel assist deactivation mode M4" in S21, or a determination of NO in S3, S7, or S32, a determination is made as to whether or not conditions for deactivating driving assist control have been met. In the case of YES (deactivation conditions have been met), the process proceeds to the end, and in the case of NO (deactivation conditions have not been met), the process returns to step S1.

In step S7, following a determination in step 2 that the mode is "hands-off mode M1," a determination is made as to whether or not a lane disappearance region S, in which a lane that continues from the current lane cannot be recognized, has been detected along an extension of the travel route of the host vehicle. In the case of YES (a lane disappearance region S was detected), the process proceeds to step S8, and in the case of NO (no lane disappearance region S was detected), the process proceeds to step S6.

In step S8, following a determination that a lane disappearance region S was detected in S7, a determination is made as to whether or not a lane change is necessary when it is assumed that the host vehicle will travel along the travel route toward the lane disappearance region S. In the case of YES (a lane change is not necessary), the process proceeds to step S9, and in the case of NO (a lane change is necessary), the process proceeds to step S10.

In step S9, following a determination in S8 that a lane change is not necessary, a position a first distance X1 from the lane disappearance start point Ps1 is set as the first position P1, and the process proceeds to step S11.

In step S10, following a determination in S8 that a lane change is necessary, a lane change start point Pe1 is set as the first position P1, and the process proceeds to step S11. In other words, the setting of the first position P1 differs depending on whether or not a lane change is necessary.

In step S11, following the setting of the first position P1 in S9 or S10, a determination is made as to whether or not there is a curve C with a turning radius at or below a prescribed value ahead of the lane disappearance region S. In the case of YES (there is no curve C), the process proceeds to step S12, and in the case of NO (there is a curve C), the process proceeds to step S13.

In step S12, following a determination in S11 that there is no curve C, a position a second distance X2, which is less than the first distance X1, from the lane disappearance start point Ps1 is set as the second position P2, and the process proceeds to step S14.

In step S13, following a determination in S11 that there is a curve C, a position the second distance X2, which is less than the first distance X1, from a curve start point Pc1 is set as the second position P2, and the process proceeds to step S14. That is, the setting of the second position P2 differs depending on whether or not there is a curve C.

In step S14, following the setting of the second position P2 in S12 or S13, a determination is made as to whether or not the host vehicle has reached the second position P1. In the case of YES (the first position P1 has been reached), the process proceeds to step S15, and in the case of NO (the first position P1 has not been reached), the determination of step S14 is repeated.

In step S15, following a determination in S14 that the first position P1 has been reached, a mode transition from "hands-off mode M1" to "hands-on mode M2" is requested, and the process proceeds to step S16.

In step S16, following the mode transition to "hands-on mode M2" in S15, a determination is made as to whether or not the driver has gripped the steering wheel 23 within a prescribed length of time since the request for the mode transition to "hands-on mode M2." In the case of YES (the steering wheel was gripped within the prescribed length of time), the process proceeds to step S17, and in the case of NO (the steering wheel was not gripped within the prescribed length of time), the process proceeds to step S23.

In step S17, following a determination in S16 that the steering wheel was gripped within the prescribed length of time, a determination is made as to whether or not the host vehicle has reached the second position P2. In the case of YES (the second position P2 was reached), the process proceeds to step S18, and in the case of NO (the second position P2 was not reached), the determination of step S17 is repeated.

In step S18, following a determination in S17 that the second position P2 was reached, a mode transition from "hands-on mode M2" to "steering wheel operation mode M3" is requested, and the process proceeds to step S19.

In step S19, following the mode transition to "steering wheel operation mode M3" in S18 or a determination in S22 that the prescribed length of time has not elapsed in M3, a determination is made as to whether or not the host vehicle has reached the lane disappearance start point Ps1. In the case of YES (the lane disappearance start point Ps1 was reached), the process proceeds to step S21, and in the case of NO (the lane disappearance start point Ps1 was not reached), the process proceeds to step S20.

In step S20, following a determination in S19 that the lane disappearance start point Ps1 was not reached, a determination is made as to whether or not the driver, holding the steering wheel 23, performed a steering wheel operation. In the case of YES (a steering wheel operation was performed), the process proceeds to step S21, and in the case of NO (a steering wheel operation was not performed), the process proceeds to step S22.

In step S21, following a determination in S19 that the lane disappearance start point Ps1 was reached or a determination in S20 that a steering wheel operation was performed, a state transition from "steering wheel operation mode M3" to "steering wheel assist deactivation mode M4" is performed, and the process proceeds to step S6.

In step S22, following a determination in S20 that a steering wheel operation was not performed, a determination is made as to whether or not a prescribed length of time has elapsed in "steering wheel operation mode M3." In the case of YES (the prescribed length of time has elapsed in M3), the process proceeds to step S23, and in the case of NO (the prescribed length of time has not elapsed in M3), the process proceeds to step S19.

In step S23, following a determination in S16 that the steering wheel was not gripped within the prescribed length of time or a determination in S22 that the prescribed length of time has not elapsed in M3, the host vehicle is decelerated and stopped, and the process proceeds to step S24. At this time, "decelerating" is displayed on the displays 61, 62, and the host vehicle is decelerated to a stop.

In step S24, following deceleration and stopping of the host vehicle in S23, driving assist control (longitudinal control+lateral control) is deactivated, and the process proceeds to the end.

In step S32, following a determination in S1 that the mode is "steering wheel assist deactivation mode M4," a determination is made as to whether or not the host vehicle has passed through the lane disappearance region S to reach the lane disappearance end point Ps2. In the case of YES (the lane disappearance end point Ps2 was reached), the process proceeds to step S33, and in the case of NO (the lane disappearance end point Ps2 was not reached), the process proceeds to step S6.

In step S33, following a determination in S32 that the lane disappearance end point Ps2 was reached, a determination is made as to whether or not lane recognition by the forward recognition camera has been resumed. In the case of YES (lane recognition was resumed), the process proceeds to step S34, and in the case of NO (lane recognition was not resumed), the process proceeds to step S6.

In step S34, following a determination in S33 that lane recognition was resumed, a mode transition from "steering wheel assist deactivation mode M4" to "hands-on mode M2" is performed, and the process proceeds to step S6.

Next, "background technology and measures for solving the problem" will be explained. The operation of the first embodiment will be divided into "operation of the control process for switching driving assist modes" and "operation of control for switching driving assist modes" for explanation.

Background Technology and Measures for Solving the Problem

A driving-assisted vehicle is known that includes a vehicle speed/headway control function and a lane-keeping function as driving assist functions to assist driving operations of a driver, that includes as a condition that a driver has their hands on a steering wheel, and that performs lane-keeping travel in a single lane.

This driving-assisted vehicle, by having as a condition that the driver has their hands on the steering wheel, consistently gives the driver agency in driving. There has been a demand to further raise the level of driving assistance, to transfer agency in driving from the driver to the system, and to allow autonomous driving travel in which the driver has their hands off the steering wheel.

However, the lane-keeping function is a function that, presupposing that a lane of a host vehicle is recognized by a forward recognition camera, keeps the host vehicle in a central section of the lane. Consequently, the lane-keeping function (a function for assisting steering wheel operation by the system) has to be deactivated if there is a lane disappearance region, which is a region in which no lane that continues from a current lane can be recognized, such as a toll plaza of a highway, or the like, along an extension of a travel route of the host vehicle.

Thus, in cases in which the level of driving assistance has been advanced so that travel is possible while the hands of the driver are off the steering wheel, the fall in the level driving assistance increases if a transition is to be made from a mode with a raised level of driving assistance to a steering wheel assist deactivation mode. To address this, in Patent Citation 1 (Japanese Laid-open Patent Application No. H9-86223), audio information indicating "automatic steering will be deactivated, please be ready" is issued from a speaker when a switch from autonomous driving to driver-engaged driving occurs, and automatic steering is deactivated to entrust steering to the driver.

Consequently, it is not possible to confirm that the driver has their hands on the steering wheel or that the driver is holding the steering wheel with their hands to maintain readiness for operation just by notifying the driver by issuing audio information. Thus, for instance, there is a danger that automatic steering will be accidentally deactivated while the driver still has their hands off the steering wheel. That is, there has been a problem in that, when agency for steering wheel operation is transferred from the system to the driver in a switch from autonomous driving to driver-engaged driving, agency is transferred all at once with a notification alone, so the transfer to the driver goes poorly.

To address this problem, the present inventors focused on the following point: using map data, etc., it is possible to acquire information indicating that there is a region in which steering wheel assist is to be deactivated due to it being impossible to recognize a lane that continues from the current lane. Ascertaining in advance the region in which steering wheel assist is to be deactivated makes it possible to produce a leeway travel segment before the host vehicle reaches the steering wheel assist deactivation point, and gripping of the steering wheel by the driver can be confirmed in this leeway travel segment.

Based on this point of focus, in the driving assist method of the present disclosure, the following solution was employed: a lane disappearance region S, in which no lane that continues from a current lane can be recognized, is detected along an extension of the travel route of the host vehicle during lane-keeping travel in which "hands-off mode M1" has been selected. If the lane disappearance region S is detected, information on the lane disappearance start point Ps1 is acquired, and mode transition positions (the first position P1 and the second position P2) are set between the host vehicle position and the lane disappearance start point. If the host vehicle reaches a mode transition position, a mode transition from "hands-off mode M1" to a steering wheel grip mode ("hands-on mode M2" or "steering wheel operation mode M3") is requested. If gripping of the steering wheel 23 by the driver has been confirmed, a mode transition is performed from the steering wheel grip mode to "steering wheel assist deactivation mode M4" before the host vehicle reaches the lane disappearance start point Ps1.

That is, the lane disappearance region S, in which steering wheel assist by the system is to be deactivated, can be ascertained in advance in a scenario involving lane-keeping travel in "hands-off mode M1," in which the level of driving assistance is raised. If the lane disappearance region S is ascertained in advance, sequence control is performed in which mode transition points are decided, and the transitions "hands-off mode M1"→"steering wheel grip mode M2, M3"→"steering wheel assist deactivation mode M4" occur. In other words, the level of driving assistance is lowered in a stepwise manner, and gripping of the steering wheel 23 by the driver is confirmed in "steering wheel grip mode M2, M3." Finally, steering wheel operation is transferred from the system (steering wheel assist control) to manual operation by the driver.

Consequently, it is possible to perform transfer from the system to the driver more reliably by lowering the level of driving assistance in a stepwise manner when it is known in advance that steering wheel assist will be deactivated in a lane-keeping travel scenario in "hands-off mode M1," in which the level of driving assistance is raised.

In cases in which a mode transition is performed, not only is the level of driving assistance lowered in a stepwise manner, but at the same time, display by the head-up display 61 and the meter display 62 is changed in a stepwise manner, and notice is provided by appealing to the driver's visual sense and, through an announcement, to the driver's auditory sense. This will be explained below based on FIGS. 6A and 6B.

First, the head-up display 61 and the meter display 62 have a steering wheel icon display unit, a speed limit display unit, a set vehicle speed display unit, a message display unit, a lane/host vehicle display unit, etc. Then, while "hands-off mode M1" is selected, the steering wheel icon display unit, for instance, displays in blue and displays an icon of the steering wheel alone, as shown in display D1 in FIGS. 6A and 6B.

Figure 6A:
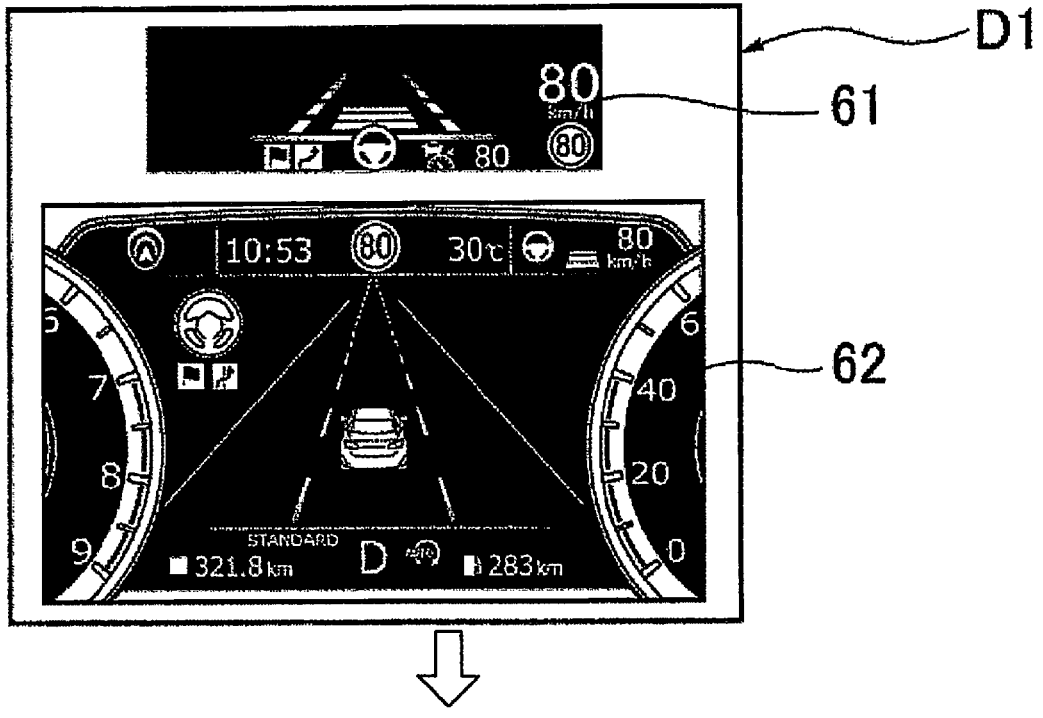
FIGS. 6A and 6B are drawings showing display examples of a display when the following mode transitions occur: hands-off mode→hands-on mode→steering wheel operation mode→steering wheel assist deactivation mode.
Figure 6A:
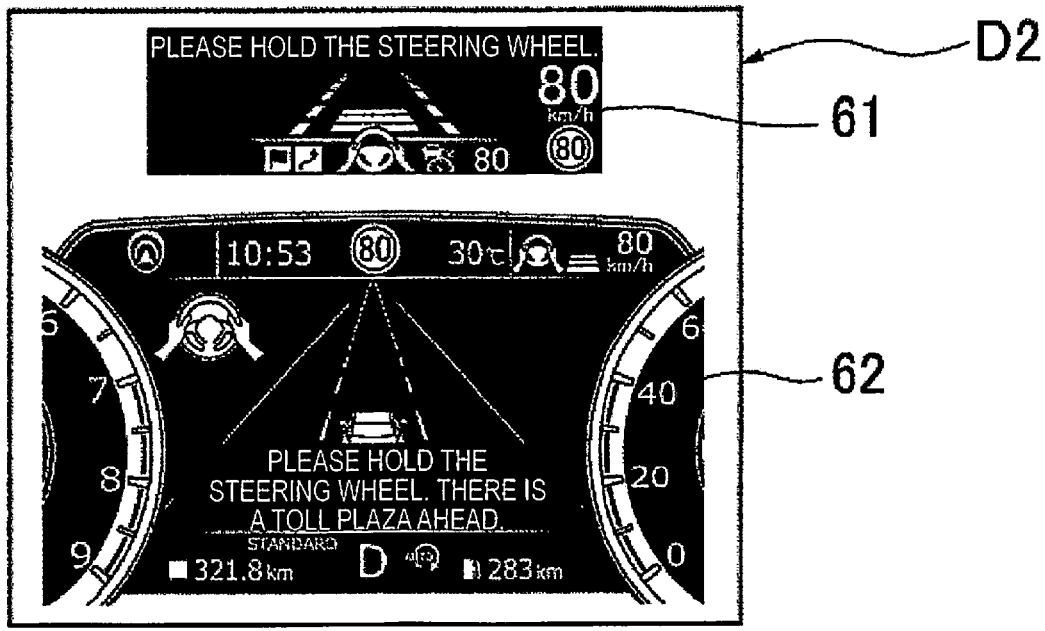
Figure 6A:
Figure 6B:
Figure 6B:
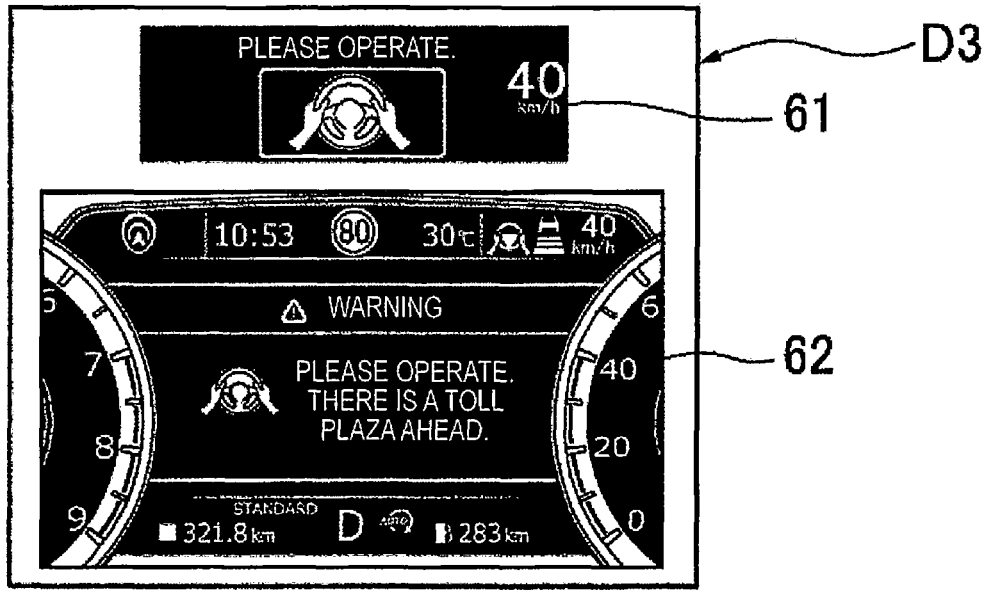
Figure 6B:
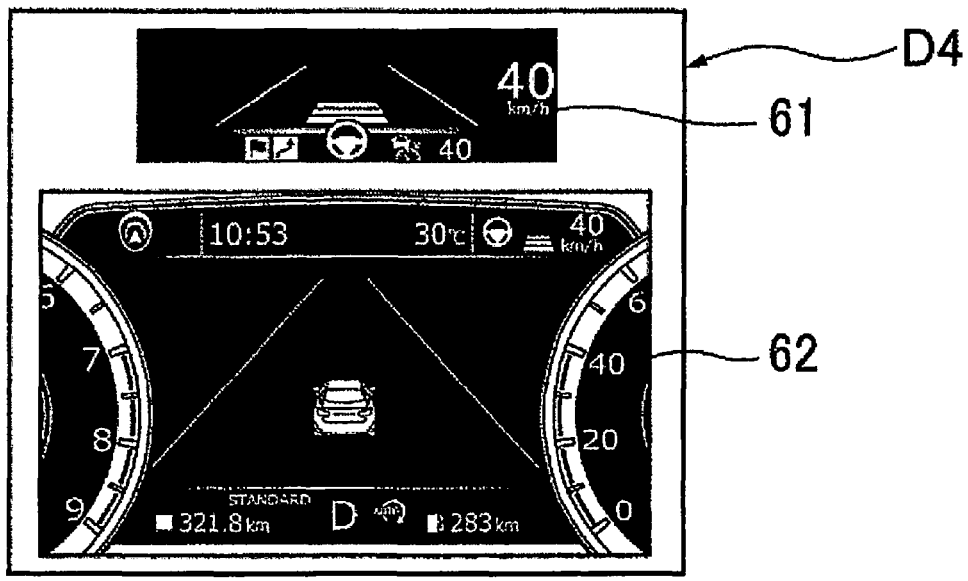

Next, if a mode transition is performed from "hands-off mode M1" to "hands-on mode M2," the steering wheel icon display unit, for instance, displays in green and displays an icon in which the steering wheel is held by hands, as shown in display D2 in FIGS. 6A and 6B. Then, "please hold the steering wheel, there is a toll plaza ahead" is displayed on the message display unit and is announced.

Next, if a mode transition is performed from "hands-on mode M2" to "steering wheel operation mode M3," the steering wheel icon display unit, for instance, displays in red and displays an icon in which the steering wheel is held by hands, as shown in display D3 in FIGS. 6A and 6B. Then, "please operate, there is a toll plaza ahead" is displayed on the message display unit and is announced.

Finally, if a mode transition is performed from "steering wheel operation mode M3" to "steering wheel assist deactivation mode M4," the steering wheel icon display unit, for instance, displays in white and displays an icon of the steering wheel and hands, as shown in display D4 in FIGS. 6A and 6B.

Thus, in cases in which a mode transition is performed in a stepwise manner from "hands-off mode M1" to "steering wheel assist deactivation mode M4," the driver can be notified of the transition in the driving assist mode through changes in what is displayed by the head-up display 61 and the meter display 62.

Operation of the Control Process for Switching Driving Assist Modes

The operation of the control process for switching driving assist modes, which is executed by the mode transition controller 47, is explained below based on the flowchart shown in FIG. 5.

First, if driving assist control is activated, "hands-on mode M2" is selected, so the process proceeds in the order S1→S2→S3→S4. In S4, a determination is made as to whether or not the hands-off conditions for switching from "hands-on mode M2" to "hands-off mode M1" have been met. A flow proceeding in the order S1→S2→S3→S4→S6 is repeated as long as it is determined that the hands-off conditions have not been met. Then, if it is determined in S4 that the hands-off conditions have been met, the process proceeds from S4 to S5, and a mode transition is performed from "hands-on mode M2" to "hands-off mode M1" in S5.

During lane-keeping travel in which "hands-off mode M1" has been selected, the process proceeds in the order S1→S2→S7. In S7, a determination is made as to whether or not a lane disappearance region S, in which no lane that continues from the current lane can be recognized, has been detected along an extension of the travel route of the host vehicle. A flow proceeding in the order S1→S2→S7→S6 is repeated as long as no lane disappearance region S is detected. Then, if it is determined in S7 that the lane disappearance region S has been detected, the process proceeds from S7 to S8, and in S8, a determination is made as to whether or not a lane change is necessary, assuming that the host vehicle will travel along the travel route toward the lane disappearance region S. If it is determined in S8 that a lane change is unnecessary, the process proceeds to S9, and if it is determined in S8 that a lane change is necessary, the process proceeds to S10. In S9, a position the first distance X1 from the lane disappearance start point Ps1 is set as the first position P1, and in S10, the lane change start point Pe1 is set as the first position P1.

Next, in S11, a determination is made as to whether or not there is a curve C with a turning radius of a prescribed value or less ahead of the lane disappearance region S. In cases in which there is no curve C, the process proceeds from S11 to S12, and in cases in which there is a curve C, the process proceeds from S11 to S13. In S12, a position the second distance X2, which is less than the first distance X1, from the lane disappearance start point Ps1 is set as the second position P2. In step S13, a position the second distance X2, which is less than the first distance X1, from the curve start point Pc1 is set as the second position P2.

Next, in S14, a determination is made as to whether or not the host vehicle has reached the first position P1, and the process proceeds to S15 if the first position P1 has been reached. In S15, a mode transition from "hands-off mode M1" to "hands-on mode M2" is requested. In S16, a determination is made as to whether or not the steering wheel has been gripped within a prescribed length of time. If the steering wheel has been gripped within the prescribed length of time, the process proceeds to S17, and if the steering wheel has not been gripped within the prescribed length of time, the process proceeds to S23.

Next, in S17, a determination is made as to whether or not the host vehicle has reached the second position P2, and the process proceeds to S18 if the second position P2 has been reached. In S18, a mode transition from "hands-on mode M2" to "steering wheel operation mode M3" is requested. Next, in S19, a determination is made as to whether or not the host vehicle has reached the lane disappearance start point Ps1. If it is determined in S19 that the lane disappearance start point Ps1 has been reached, the process proceeds to S21. In S21, a mode transition is performed from "steering wheel operation mode M3" to "steering wheel assist deactivation mode M4," and the process proceeds to S6.

Next, in S20, a determination is made as to whether or not a steering wheel operation has been performed. If it is determined that a steering wheel operation has been performed, the process proceeds to S21. In S21, a mode transition is performed from "steering wheel operation mode M3" to "steering wheel assist deactivation mode M4," and the process proceeds to S6.

On the other hand, if it is determined in S20 that no steering wheel operation has been performed, the process proceeds to S22. In S22, a determination is made as to whether a prescribed length of time has elapsed in M3. If it is determined that the prescribed length of time has not elapsed in "steering wheel operation mode M3," a flow proceeding in the order S19→S20→S22 is repeated. If the prescribed length of time has elapsed in a state in which the lane disappearance start point Ps1 has not been reached and no steering wheel operation has been performed, the process proceeds to S23. In S23, the host vehicle is decelerated and stopped, and in S24, driving assist control (longitudinal control+lateral control) is deactivated, and driving assist control ends.

If "steering wheel assist deactivation mode M4" is selected due to a mode transition to "steering wheel assist deactivation mode M4" in S21, the process proceeds from S21 to S6→S1→S32. In S32, a determination is made as to whether the host vehicle has passed through the lane disappearance region S and reached the lane disappearance end point Ps2. A flow proceeding S6→S1→S32 is repeated as long as the lane disappearance end point Ps2 has not been reached, and the selection of "steering wheel assist deactivation mode M4" is maintained. If it is determined in S32 that the lane disappearance end point Ps2 has been reached, the process proceeds to S33.

In S33, a determination is made as to whether or not lane recognition by the forward recognition camera has been resumed. Then, in cases in which lane recognition has been resumed, the process proceeds from S33 to S34. In S34, a mode transition is performed from "steering wheel assist deactivation mode M4" to "hands-on mode M2," and the process proceeds to S6. Then, the process proceeds in the order S1→S2→S3→S4. If it is determined in S4 that the hands-off conditions have been met, the process proceeds from S4 to S5, a mode transition is performed from "hands-on mode M2" to "hands-off mode M1" in S5, and the mode is restored to "hands-off mode M1".

In this way, the mode transition control process proceeding "hands-off mode M1"→"hands-on mode M2"→"steering wheel operation mode M3"→"steering wheel assist deactivation mode M4" is divided in the following cases (a)-(d), which differ in the setting of the first position P1 and the second position P2.

(a) When a lane change is unnecessary and there is no curve C, the first position P1 is set to a position the first distance X1 from the lane disappearance start point Ps1, and the second position P2 is set to a position the second distance X2, which is less than the first distance X1, from the lane disappearance start point Ps1.

(b) When a lane change is unnecessary and there is a curve C, the first position P1 is set to a position the first distance X1 from the curve start point Pc1, and the second position P2 is set to a position the second distance X2, which is less than the first distance X1, from the curve start point Pc1.

(c) When a lane change is necessary and there is no curve C, the first position P1 is set to the lane change start point Pe1, and the second position P2 is set to a position the second distance X2 from the lane disappearance start point Ps1.

(d) When a lane change is necessary and there is a curve C, the first position P1 is set to the lane change start point Pe1, and the second position P2 is set to a position the second distance X2 from the curve start point Pc1.

Operation of Control for Switching Driving Assist Modes

The operation of control for switching driving assist modes in lane-keeping travel toward a lane disappearance region S based on "hands-off mode M1" is divided below into four different travel scenarios for explanation, corresponding to the cases (a)(d) above.

Figure 7:
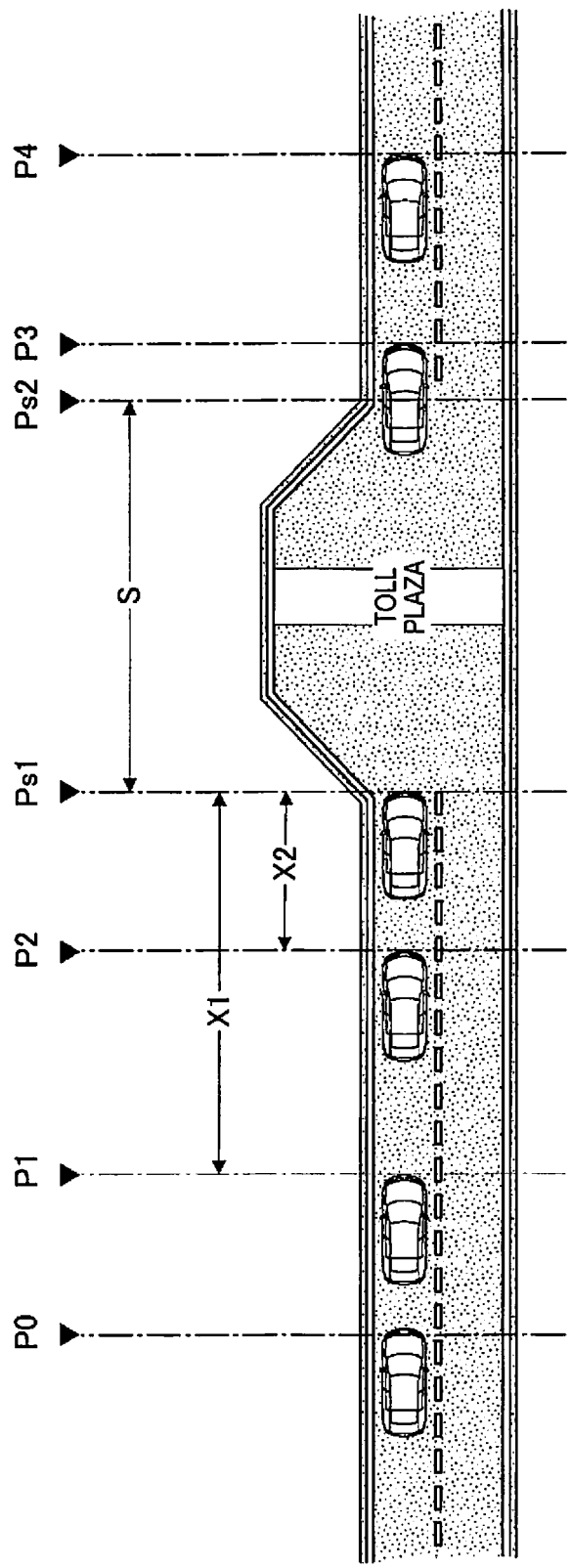
FIG. 7 is an explanatory diagram of operation showing the operation of driving assist mode transition control in a travel scenario in which a vehicle in the hands-off mode is heading toward a toll plaza on a main road.

Lane Change Unnecessary/Curve Absent Travel Scenario: FIG. 7

When a lane change is unnecessary and there is no curve C, the first position P1 is set to a position the first distance X1 (which differs according to the speed limit of the roadway, etc., but could be, for instance, around 800 m) from the lane disappearance start point Ps1, as shown in FIG. 7. The second position P2 is set to a position the second distance X2 (which differs according to the speed limit of the roadway, etc., but could be, for instance, around 150 m), which is less than the first distance X1, from the lane disappearance start point Ps1.

A toll plaza on a main road (lane disappearance region S), in which no lane that continues from the current lane can be recognized, will be considered to have been detected along an extension of the travel route of the host vehicle based on the high-accuracy map data during lane-keeping travel toward the toll plaza in "hands-off mode M1." In this case, information on the lane disappearance start point Ps1 and the lane disappearance end point Ps2 is acquired if the toll plaza is detected. The first position P1 and the second position P2, which have the lane disappearance start point Ps1 as an origin, are set between the host vehicle position and the lane disappearance start point Ps1.

If the host vehicle, in lane-keeping travel with "hands-off mode M1" selected, reaches the first position P1 from a detection position P0, a mode transition from "hands-off mode M1" to "hands-on mode M2" is requested. A mode transition from "hands-on mode M2" to "steering wheel operation mode M3" is requested if the host vehicle subsequently reaches the second position P2. A mode transition is performed from "steering wheel operation mode M3" to "steering wheel assist deactivation mode M4" if the host vehicle subsequently reaches the lane disappearance start point Ps1.

If the host vehicle, with "steering wheel assist deactivation mode M4" selected, enters the toll plaza, the driver passes through the toll plaza while performing steering wheel operations, and reaches the lane disappearance end point Ps2. If lane recognition is resumed at a position P3 immediately after the lane disappearance end point Ps2 has been reached, a mode transition from "steering wheel assist deactivation mode M4" to "hands-on mode M2" is requested. Furthermore, if the hands-off conditions are met at a position P4 during lane-keeping travel in "hands-on mode M2," a mode transition is performed from "hands-on mode M2" to "hands-off mode M1."

Figure 8:
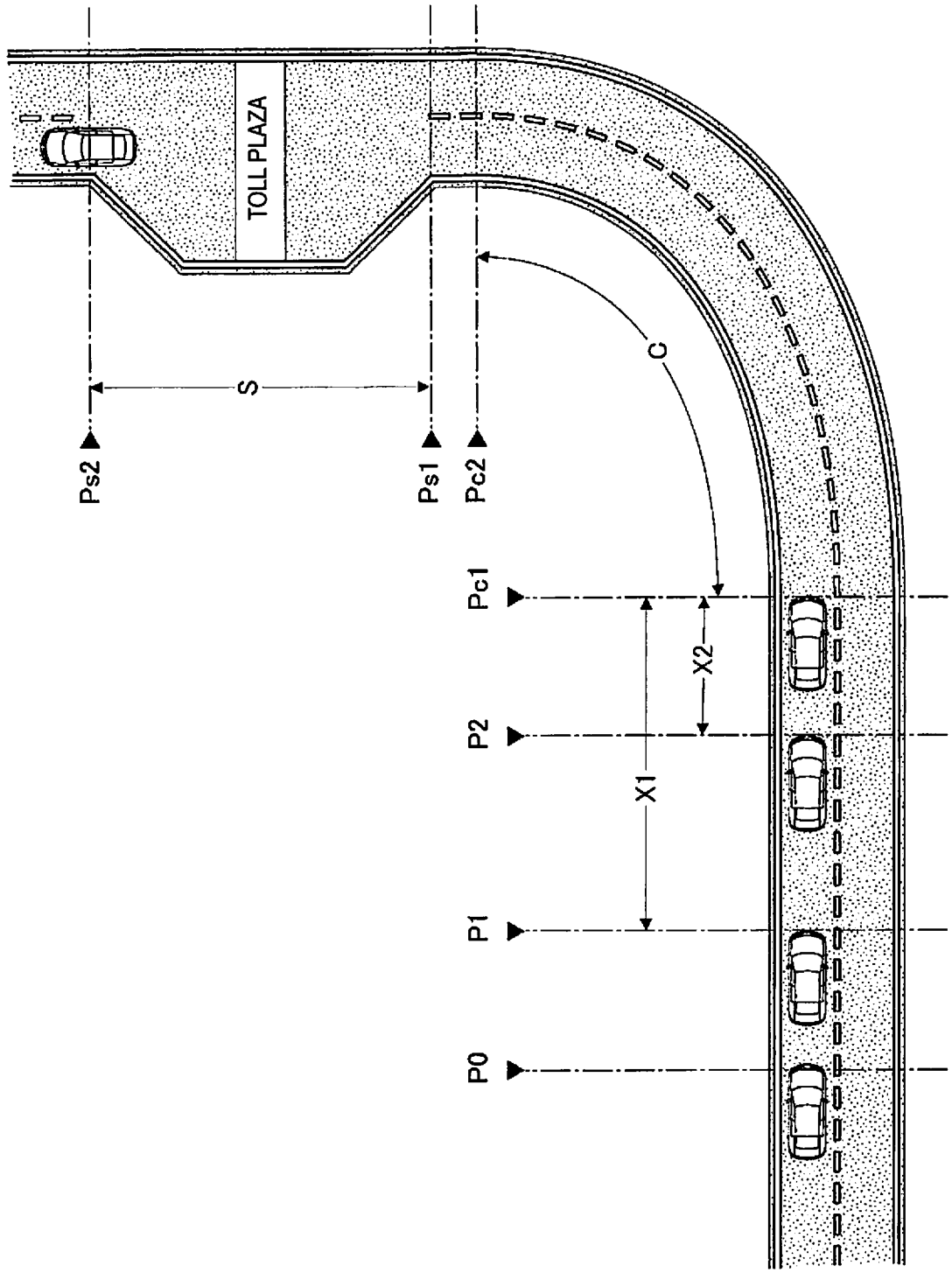
FIG. 8 is an explanatory diagram of operation showing the operation of driving assist mode transition control in a travel scenario in which a vehicle in the hands-off mode is heading toward a curve and a toll plaza on a main road.

Lane Change Unnecessary/Curve Present Travel Scenario: FIG. 8

When a lane change is unnecessary and there is a curve C, the first position P1 is set to a position the first distance X1 from the curve start point Pc1, as shown in FIG. 8. The second position P2 is set to a position the second distance X2, which is less than the first distance X1, from the curve start point Pc1.

A curve C and a toll plaza on a main road (lane disappearance region S), in which no lane that continues from the current lane can be recognized, will be considered to have been detected along an extension of the travel route of the host vehicle based on the high-accuracy map data during lane-keeping travel toward the curve C and the toll plaza in "hands-off mode M1." In this case, information on the curve start point Pc1 and a curve end point Pc2 is acquired if the curve C is detected, and information on the lane disappearance start point Ps1 and the lane disappearance end point Ps2 is acquired if the toll plaza is detected. The first position P1 and the second position P2, which have the curve start point Pc1 as an origin, are set between the host vehicle position and the lane disappearance start point Ps1.

If the host vehicle, in lane-keeping travel with "hands-off mode M1" selected, reaches the first position P1 from a detection position P0, a mode transition from "hands-off mode M1" to "hands-on mode M2" is requested. A mode transition from "hands-on mode M2" to "steering wheel operation mode M3" is requested if the host vehicle reaches the second position P2.

Then, if the host vehicle enters the curve start point Pc1, the curve C up to the curve end point Pc2 is passed through by turning travel using "steering wheel operation mode M3." A mode transition is performed from "steering wheel operation mode M3" to "steering wheel assist deactivation mode M4" if the lane disappearance start point Ps1 is reached.

If the host vehicle, with "steering wheel assist deactivation mode M4 selected," enters the toll plaza, the driver passes through the toll plaza while performing steering wheel operations, and reaches the lane disappearance end point Ps2. When the lane disappearance end point Ps2 is reached, "steering wheel assist deactivation mode M4" is maintained thereafter as well, since the highway will have ended.

Figure 9:
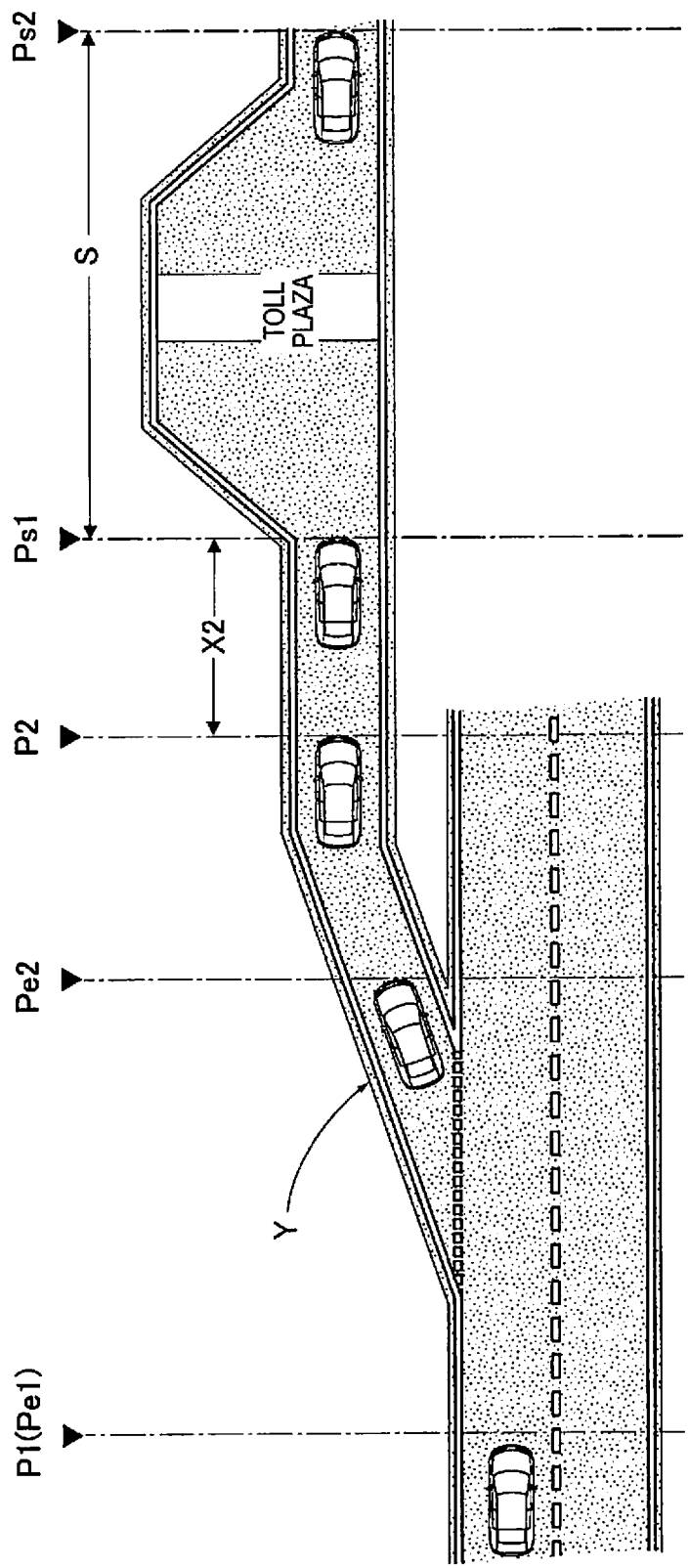
FIG. 9 is an explanatory diagram of operation showing the operation of driving assist mode transition control in a travel scenario in which a vehicle in the hands-off mode is heading toward a toll plaza on a branch road.

Lane Change Necessary/Curve Absent Travel Scenario: FIG. 9

When a lane change is necessary and there is no curve C, the first position P1 is set to the position of the lane change start point Pe1, as shown in FIG. 9. The second position P2 is set to a position the second distance X2 from the lane disappearance start point Ps1.

A branch road Y and a toll plaza on the branch road (lane disappearance region S), in which no lane that continues from the current lane can be recognized, will be considered to have been detected along an extension of the travel route of the host vehicle based on the high-accuracy map data during lane-keeping travel toward the toll plaza on the branch road in "hands-off mode M1." In this case, information on the lane change start point Pe1 and the lane change end point Pe2 according to the route travel assist function are acquired if the branch road Y is detected. Information on the lane disappearance start point Ps1 and the lane disappearance end point Ps2 is acquired if the toll plaza is detected. The first position P1 (lane change start point Pe1) and the first position P2, which has the lane disappearance start point Ps1 as an origin, are set between the host vehicle position and the lane change start point Ps1.

If the host vehicle, in lane-keeping travel with "hands-off mode M1" selected, reaches the first position P1 Pe1), a mode transition from "hands-off mode M1" to "hands-on mode M2" is requested, and a lane change by the route travel assist function is started. The host vehicle enters the branch road Y, changes lanes, and proceeds to the lane change end point Pe2, ending the lane change.

A mode transition from "hands-on mode M2" to "steering wheel operation mode M3" is requested if the host vehicle reaches the second position P2 after the lane change has ended. Then, a mode transition is performed from "steering wheel operation mode M3" to "steering wheel assist deactivation mode M4" if the lane disappearance start point Ps1 is reached.

If the host vehicle, with "steering wheel assist deactivation mode M4 selected," enters the toll plaza, the driver passes through the toll plaza while performing steering wheel operations, and reaches the lane disappearance end point Ps2. When the lane disappearance end point Ps2 is reached, "steering wheel assist deactivation mode M4" is maintained thereafter as well, since the highway will have ended.

Figure 10:
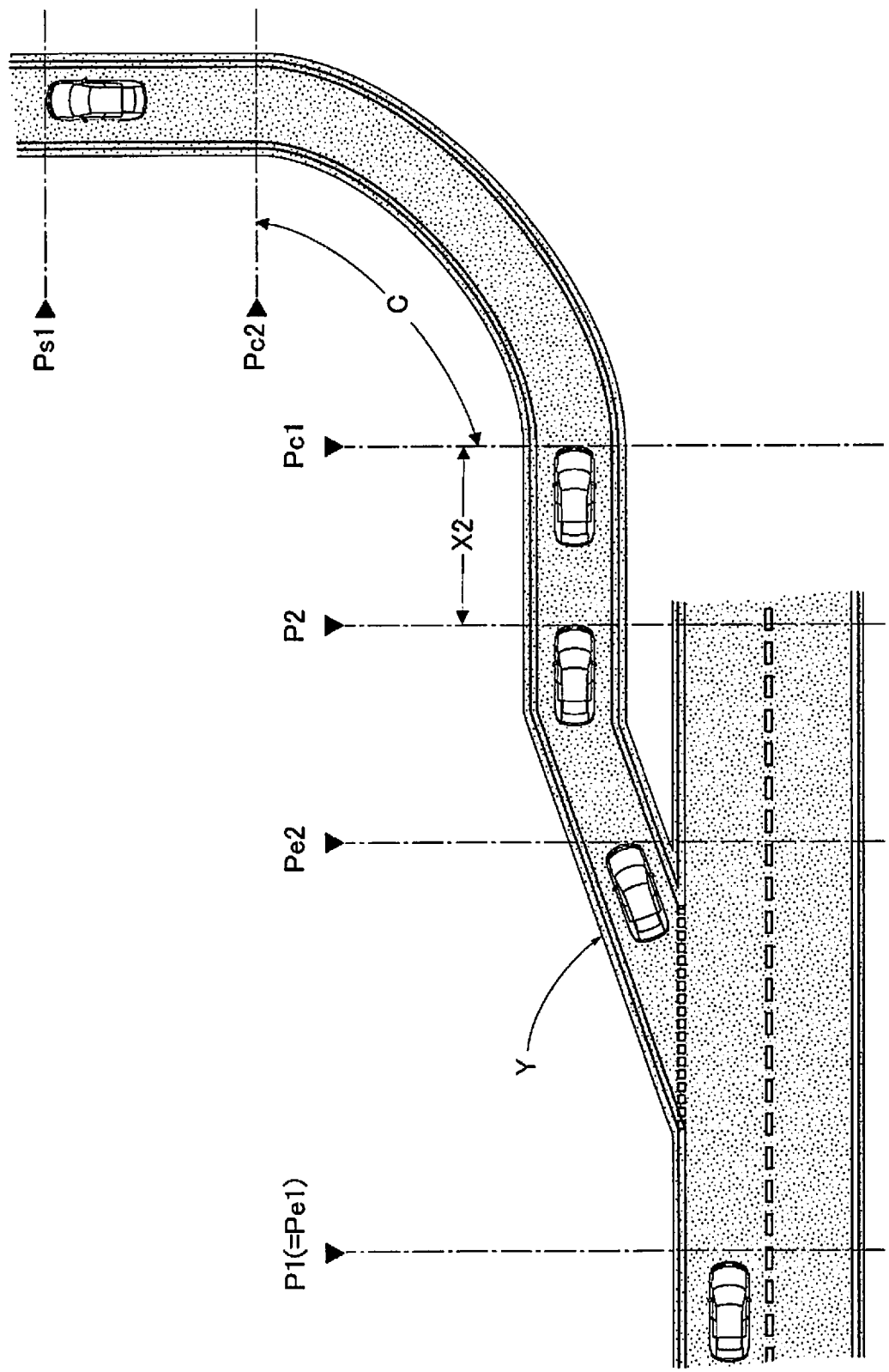
FIG. 10 is an explanatory diagram of operation showing the operation of driving assist mode transition control in a travel scenario in which a vehicle in the hands-off mode is heading toward a curve and a toll plaza on a branch road.

Lane Change Necessary/Curve Present Travel Scenario: FIG. 10

When a lane change is necessary and there is a curve C, the first position P1 is set to the position of the lane change start point Pe1, as shown in FIG. 10 The second position P2 is set to a position the second distance X2 from the curve start point Pc1.

A branch road Y, a curve C, and a toll plaza on the branch road (lane disappearance region S), in which no lane that continues from the current lane can be recognized, will be considered to have been detected along an extension of the travel route of the host vehicle based on the high-accuracy map data during lane-keeping travel toward the curve C and the toll plaza on the branch road in "hands-off mode M1." In this case, information on the lane change start point Pe1 and the lane change end point Pe2 according to the route travel assist function are acquired if the branch road Y is detected. Information on the curve start point Pc1 and the curve end point Pc2 is acquired if the curve C is detected. Information on the lane disappearance start point Ps1 and the lane disappearance end point Ps2 is acquired if the toll plaza is detected. The first position P1 (=lane change start point Pe1) and the second position P2, which has the lane disappearance start point Ps1 as an origin, are set between the host vehicle position and the lane change start point Ps1.

If the host vehicle, in lane-keeping travel with "hands-off mode M1" selected, reaches the first position P1 (Pe1), a mode transition from "hands-off mode M1" to "hands-on mode M2" is requested, and a lane change by the route travel assist function is started. The host vehicle enters the branch road Y, changes lanes, and proceeds to the lane change end point Pe2, whereby the lane change ends. A mode transition from "hands-on mode M2" to "steering wheel operation mode M3" is requested if the host vehicle reaches the second position P2.

Then, if the host vehicle enters the curve start point Pc1, the curve C up to the curve end point Pc2 is passed through by turning travel using "steering wheel operation mode M3." A mode transition is performed from "steering wheel operation mode M3" to "steering wheel assist deactivation mode M4" if the lane disappearance start point Ps1 is reached.

If the host vehicle, with "steering wheel assist deactivation mode M4 selected," enters the toll plaza, the driver passes through the toll plaza while performing steering wheel operations, and reaches the lane disappearance end point Ps2. When the lane disappearance end point Ps2 is reached, "steering wheel assist deactivation mode M4" is maintained thereafter as well, since the highway will have ended.

As explained above, the driving assist method and driving assist device of the first embodiment exhibit the effects enumerated below.

(1) This driving assist method has a vehicle speed/headway control function and a lane-keeping function as driving assist functions to assist driving operations by the driver, and uses a mode transition controller 47 for performing transitions between driving assist modes. The method has, as the driving assist modes, a "hands-off mode M1," which allows the driver to take their hands off a steering wheel 23, "steering wheel grip modes M2, M3," which have as a condition that the driver is holding the steering wheel 23 with their hands, and a "steering wheel assist deactivation mode M4," which deactivates the lane-keeping function. During lane-keeping travel in which "hands-off mode M1" has been selected, a lane disappearance region S, in which no lane that continues from a current lane can be recognized, is detected along an extension of a travel route of a host vehicle. When the lane disappearance region S is detected, information on a lane disappearance start point Ps1 is acquired, and mode transition positions (a first position P1 and a second position P2) are set between a host vehicle position and the lane disappearance start point Ps1. When the host vehicle reaches a mode transition position, a mode transition from "hands-off mode M1" to "steering wheel grip mode M2, M3" is requested. When gripping of the steering wheel 23 by the driver has been confirmed, a mode transition is performed from "steering wheel grip mode M2, M3" to "steering wheel assist deactivation mode M4" before the host vehicle reaches the lane disappearance start point Ps1 (FIG. 4). Consequently, it is possible to provide a driving assist method that can perform transfer from the system to the driver more reliably by lowering the level of driving assistance in a stepwise manner when it is known in advance that steering wheel assist will be deactivated in a lane-keeping travel scenario in a driving assist mode in which the level of driving assistance is raised.

Figure 5:
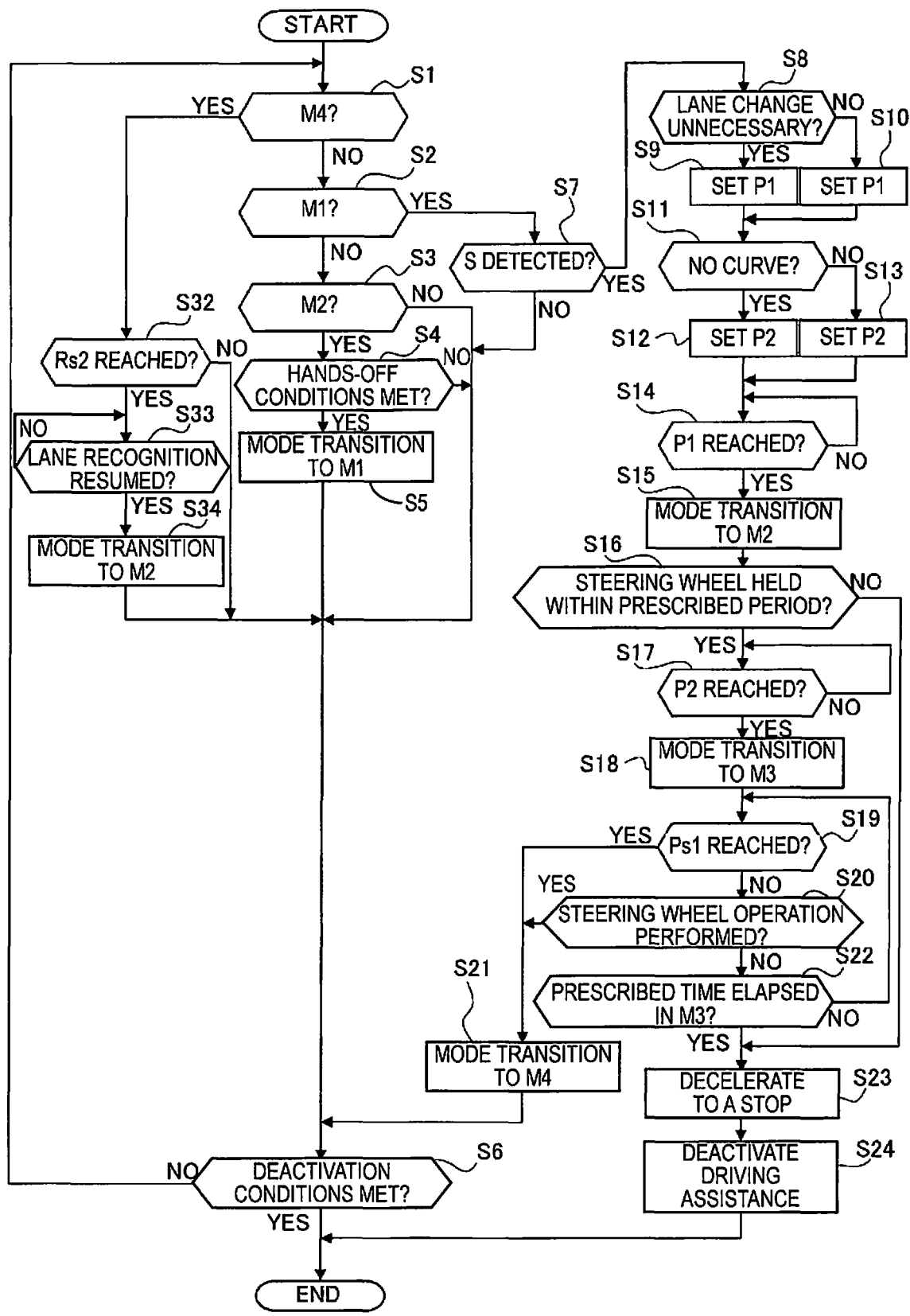
FIG. 5 is a flowchart showing the flow of a control process for switching driving assist modes that is executed by the mode transition controller provided in the ADAS control unit.

(2) In cases in which it was not possible to confirm gripping of the steering wheel by the driver before the lane disappearance start point Ps1 was reached after the mode transition to "steering wheel grip mode M2, M3" was requested, the host vehicle is decelerated and stopped, and then the vehicle speed/headway control function and the lane-keeping function, which are driving assist functions, are deactivated (S23 and S24 in FIG. 5). Consequently, in cases in which it was not possible to confirm gripping of the steering wheel by the driver before the lane disappearance start point Ps1 is reached, a failsafe function can be achieved by control deactivation through deceleration and stopping.

(3) When the lane disappearance region S is detected on an extension of the travel route of the host vehicle during lane-keeping travel in which "hands-off mode M1" has been selected, the mode transition positions (the first position P1 and the second position P2) are then set by back-calculation so that the host vehicle can be decelerated and stopped when the lane disappearance start point Ps1 has been reached (S9, S10, S10, and S13 in FIG. 5). Consequently, the mode transition positions (the first position P1 and the second position P2) can be set to suitable positions that enable the host vehicle to be decelerated and stopped when the lane disappearance start point Ps1 has been reached.

(4) The driving assist method includes, as the steering wheel grip modes, a "hands-on mode M2," which has as a condition that the driver has their hands on the steering wheel, and a "steering wheel operation mode M3," which encourages the driver to perform steering wheel operations. When information on the lane disappearance start point Ps1 is acquired, the first position P1 and the second position P2 are set between the host vehicle position and the lane disappearance start point Ps1. When the host vehicle reaches the first position P1, a mode transition from "hands-off mode M1" to "hands-on mode M2" is requested. When the host vehicle reaches the second position P2, a mode transition from "hands-on mode M2" to "steering wheel operation mode M3" is requested. Before the host vehicle reaches the lane disappearance start point Ps1 when confirmation has been made that the driver is holding the steering wheel 23, a mode transition is performed from "steering wheel operation mode M3" to "steering wheel assist deactivation mode M4" (S16→S17→S18→S19→S21 in FIG. 5). Consequently, in a lane-keeping travel scenario in "hands-off mode M1," it can be ensured that transfer from the system to the driver will occur without discomfort before the host vehicle reaches the lane disappearance start point Ps1 when it has been confirmed that the driver is gripping the steering wheel 23.

(5) After a mode transition from "hands-on mode M2" to "steering wheel operation mode M3" is requested, when a steering wheel operation is detected before the host vehicle reaches the lane disappearance start point Ps1, a mode transition is performed from "steering wheel operation mode M3" to "steering wheel assist deactivation mode M4" (S19→S20→S21 in FIG. 5). Consequently, in a lane-keeping travel scenario in "hands-off mode M1," it can be ensured that transfer from the system to the driver will occur without discomfort if a steering wheel operation has been detected before the host vehicle reaches the lane disappearance start point Ps1.

(6) After a mode transition from "hands-off mode M1" to "hands-on mode M2" has been requested, the touch sensor 92 monitors whether or not the driver has their hands on the steering wheel 23. After a mode transition from "hands-on mode M2" to "steering wheel operation mode M3" has been requested, the torque sensor 93 monitors whether or not the driver has performed a steering wheel operation (S16 and S20 in FIG. 5). Consequently, when the method has a "hands-on mode M2" and a "steering wheel operation mode M3" as steering wheel grip modes, forms of behavior of the driver with respect to the steering wheel 23 are separated into the two modes, enabling more accurate monitoring.

(7) In cases in which a lane-keeping travel path using "hands-off mode M1" is a roadway that does not require the host vehicle to change lanes, the first position P1 is set to a position a first distance X1 from the lane disappearance start point Ps1, and the second position P2 is set to a position a second distance X2, which is less than the first distance X1, from the lane disappearance start point Ps1 (S9 and S12 in FIG. 5). Consequently, in cases in which the lane-keeping travel path using "hands-off mode M1" is a roadway that does not require the host vehicle to change lanes, the first position P1 and the second position P2 can be set with the lane disappearance start point Ps1 as the origin.

(8) The driving assist method includes a route travel assist function that, in cases in which the driver has set a destination, assists lane changes using steering control when the lane change start point Pe1 necessary for travel along the travel route is reached and an intention to perform a lane change by driver operation is confirmed. In cases in which the lane-keeping travel path using "hands-off mode M1" is a roadway that requires the host vehicle to change lanes, the first position P1 is set to a lane change start point Pe1, and the second position P2 is set to a position separated by a prescribed distance (the second distance X2) from the lane disappearance start point Ps1 (S10 in FIG. 5). Consequently, in cases in which the lane-keeping travel path using "hands-off mode M1" is a roadway that requires the host vehicle to change lanes, the first position P1 can be set to the lane change start point Pe1, and the second position P2 can be set with the lane disappearance start point Ps1 as the origin. In addition, in cases in which the lane-keeping travel path is a roadway that requires a lane change, the route travel assist function can be used to perform the lane change on the condition that the travel route is generated based on the setting of the destination by the driver (interaction with the navigation system 7).

(9) In cases in which there is a curve C with a turning radius at or below a prescribed value ahead of the lane disappearance region S when the first position P1 or the second position P2 is being set, the origin for setting the position is changed from the lane disappearance start point Ps1 to the curve start point Pc1 of the curve C (S13 in FIG. 5). Consequently, in cases in which there is a curve C with a turning radius at or below the prescribed value ahead of the lane disappearance region S, it is possible to avoid the mode transition positions being set to a position along the curve C, and the curve C can be passed through using stable lane-keeping travel.

(10) In cases in which there is a curve C with a turning radius at or below the prescribed value ahead of the lane disappearance region S, a target lateral acceleration for curve-coordinated deceleration in "steering wheel operation mode M3" is made lower than the value of the target lateral acceleration for curve-coordinated deceleration in "hands-on mode M2," "hands-off mode M1," and "steering wheel assist deactivation mode M4." Consequently, the driver can be given a sense of security by making the vehicle speed when steering wheel operation is handed over to the driver on the curve C lower than in the other modes. Moreover, it is possible to ensure a greater amount of time for the driver to adjust the feeling of operation after the handover.

(11) When the host vehicle passes through the lane disappearance region S to reach the lane disappearance end point Ps2 with "steering wheel assist deactivation mode M4" selected and lane recognition is resumed, a mode transition is performed from "steering wheel assist deactivation mode M4" to "hands-on mode M2" (S32→S33→S34 in FIG. 5). When the hands-off conditions are met during lane-keeping travel in "hands-on mode M2," a mode transition is performed from "hands-on mode M2" to "hands-off mode M1" (S3→S4→S5 in FIG. 5). Consequently, even in cases in which steering wheel assist control has been deactivated, it is possible to ensure long lane-keeping travel segments with "hands-off mode M1" selected by opening the possibility of restoring "hands-off mode M1." That is, "hands-on mode M2" can be restored from "steering wheel assist deactivation mode M4" on the condition that lane recognition has resumed. Furthermore, "hands-off mode M1" can be restored when the hands-off conditions are met while "hands-on mode M2" has been selected.

(12) This driving assist device has a vehicle speed/headway control function and a lane-keeping function as driving assist functions to assist driving operations by the driver, and is provided with a mode transition controller 47 for performing transitions between driving assist modes. The method has, as the driving assist modes, a "hands-off mode M1," which allows the driver to take their hands off a steering wheel, "steering wheel grip modes M2, M3," which have as a condition that the driver is holding the steering wheel with their hands, and a "steering wheel assist deactivation mode M4," which deactivates the lane-keeping function. The mode transition controller 47 has: a lane disappearance region detection unit 471 that detects a lane disappearance region S, in which no lane that continues from a current lane can be recognized, along an extension of a travel route of a host vehicle during lane-keeping travel in which "hands-off mode M1" has been selected; a position setting unit 472 that acquires information on a lane disappearance start point Ps1 and sets mode transition positions (a first position P1 and a second position P2) between a host vehicle position and the lane disappearance start point Ps1 when the lane disappearance region S is detected; mode transition request units (a hands-on mode transition request unit 473 and a steering wheel operation mode transition request unit 474) that request a mode transition from "hands-off mode M1" to "steering wheel grip mode M2, M3" if the host vehicle reaches a mode transition position; and a steering wheel assist deactivation mode transition unit 475 that performs a mode transition from "steering wheel grip mode M2, M3" to "steering wheel assist deactivation mode M4" before the host vehicle reaches the lane disappearance start point Ps1 if gripping of the steering wheel 23 by the driver has been confirmed (FIG. 4). Consequently, it is possible to provide a driving assist device that can perform transfer from the system to the driver more reliably by lowering the level of driving assistance in a stepwise manner when it is ascertained in advance that steering wheel assist will be deactivated in a lane-keeping travel scenario in a mode in which the level of driving assistance is raised.

The driving assist method and the driving assist method of the present disclosure have been described above based on the first embodiment. However, the specific configuration is not limited to the first embodiment; design changes, additions, etc., can be made as long as these do not deviate from the scope of the invention as in the claims.

In the first embodiment, an example of the mode transition controller 47 was presented that performed the mode transitions "hands-off mode M1"→"hands-on mode M2"→"steering wheel operation mode M3"→"steering wheel assist deactivation mode M4." However, the mode transition controller can also have at least one mode in which it is possible to confirm that the driver is holding the steering wheel between "hands-off mode" and "steering wheel assist deactivation mode." For instance, an example can also be provided in which the mode transitions "hands-off mode"→"steering wheel grip mode"→"steering wheel assist deactivation mode" are performed. Furthermore, an example can also be provided in which the mode transitions "hands-off mode"→"hands-on mode"→"steering wheel grip mode"→"steering wheel operation mode"→"steering wheel assist deactivation mode" are performed.

In the first embodiment, an example was presented in which the driving assist method and the driving assist device of the present disclosure were employed in a driving-assisted vehicle having an onboard advanced driver assist system (ADAS) that assists driving operations of the driver. However, the driving assist method and the driving assist device of the present disclosure can be applied to a self-driving vehicle that performs operation assistance control for driving, braking, and steering angle in accordance with a target travel path and that travels by autonomous driving (AD) when an autonomous driving mode is selected.

The invention claimed is:

1. A driving assist method that includes a vehicle speed/headway control function and a lane-keeping function as driving assist functions to assist driving operations by a driver, and that uses a mode transition controller for transitioning between driving assist modes, the driving assist method comprising:

the driving assist modes including a hands-off mode in which the driver is allowed to take their hands off a steering wheel, a hands-on mode that includes as a condition that the driver has their hands on the steering wheel, a steering wheel operation mode that encourages the driver to operate the steering wheel, and a steering wheel assist deactivation mode in which the lane-keeping function is deactivated;

acquiring information on a steering wheel assist deactivation region in which steering wheel assist is to be deactivated during lane-keeping travel in which the hands-off mode has been selected requesting a mode transition from the hands-off mode to the hands-on mode based on the information on the steering wheel assist deactivation region; and determining whether or not the driver has their hands on the steering wheel after the mode transition to the hands-on mode has been requested;

requesting a mode transition from the hands-on mode to the steering wheel operation mode on the condition that it is confirmed that the driver has their hands on the steering wheel;

determining whether or not the driver has performed a steering wheel operation after the mode transition to the steering wheel operation mode has been requested; and performing a mode transition from the steering wheel operation mode to the steering wheel assist deactivation mode on the condition that a steering wheel operation by the driver is confirmed before the host vehicle reaches the steering wheel assist deactivation region.

2. The driving assist method as set forth in claim 1, wherein in cases in which it was not possible to confirm that the driver has their hands on the steering wheel within a prescribed length of time after the mode transition to the hands-on mode was requested, and in cases in which a prescribed length of time has elapsed in which it has not been possible to confirm a steering wheel operation by the driver after the mode transition to the steering wheel operation mode was requested, the host vehicle is decelerated and stopped, and then the vehicle speed/headway control function and the lane-keeping function, which are driving assist functions, are deactivated.

3. The driving assist method as set forth in claim 2, further comprising monitoring a touch sensor as to whether or not the driver has their hands on the steering wheel after requesting the mode transition from the hands-off mode to the hands-on mode; and monitoring a torque sensor as to whether or not the driver has performed a steering wheel operation after requesting the mode transition from the hands-on mode to the steering wheel operation mode.

4. A driving assist method that includes a vehicle speed/headway control function and a lane-keeping function as driving assist functions to assist driving operations by a driver, and that uses a mode transition controller for transitioning between driving assist modes, the driving assist method comprising:

the driving assist modes including a hands-off mode in which the driver is allowed to take their hands off a steering wheel, a hands-on mode that includes as a condition that the driver has their hands on the steering wheel, a steering wheel operation mode that encourages the driver to perform a steering wheel operation, and a steering wheel assist deactivation mode in which the lane-keeping function is deactivated;

acquiring information that a lane disappearance region, in which no lane that continues from a current lane can be recognized, exists along an extension of a travel route of a host vehicle during lane-keeping travel in which the hands-off mode has been selected;

acquiring information on a lane disappearance start point when the lane disappearance region is known in advance, and setting a first position and a second position between a host vehicle position and the lane disappearance start point;

requesting a mode transition from the hands-off mode to the hands-on mode when the host vehicle reaches the first position;

requesting a mode transition from the hands-on mode to the steering wheel operation mode when the host vehicle reaches the second position; and performing a mode transition from the steering wheel operation mode to the steering wheel assist deactivation mode before the host vehicle reaches the lane disappearance start point when confirmation has been made that the driver is holding the steering wheel.

5. The driving assist method as set forth in claim 4, wherein after the mode transition from the hands-on mode to the steering wheel operation mode is requested, performing the mode transition is performed from the steering wheel operation mode to the steering wheel assist deactivation mode when a steering wheel operation is detected before the host vehicle reaches the lane disappearance start point.

6. The driving assist method as set forth in claim 4, wherein determining whether a lane change is necessary or unnecessary and whether a curve is present or absent when the information on the lane disappearance start point is acquired; and the first position and the second position are set in accordance with results of a determination of whether the lane change is necessary or unnecessary and whether the curve is present or absent.

7. The driving assist method as set forth in claim 6, wherein in cases in which a lane-keeping travel path using the hands-off mode is a roadway that does not require the host vehicle to change lanes, the first position is set to a position a first distance from the lane disappearance start point, and the second position is set to a position the second distance, which is less than the first distance, from the lane disappearance start point.

8. The driving assist method as set forth in claim 6, wherein the driving assist method includes a route travel assist function that, in cases in which the driver has set a destination, assists lane changes using steering control when a lane change start point necessary for travel along the travel route is reached and an intention to perform a lane change by driver operation is confirmed; and in cases in which the lane-keeping travel path using the hands-off mode is a roadway that requires the host vehicle to change lanes, the first position is set to the lane change start point, and the second position is set to a position separated by a prescribed distance from the lane disappearance start point.

9. The driving assist method as set forth in claim 6, wherein in cases in which there is a curve with a turning radius at or below a prescribed value ahead of the lane disappearance region when the first position or the second position is being set, the origin for setting the position is changed from the lane disappearance start point to the curve start point of the curve.

10. The driving assist method as set forth in claim 9, wherein in cases in which there is a curve with a turning radius at or below the prescribed value ahead of the lane disappearance region, a target lateral acceleration for curve-coordinated deceleration in the steering wheel operation mode is made lower than the values of the target lateral acceleration for curve-coordinated deceleration in the hands-on mode, the hands-off mode, and the steering wheel assist deactivation mode.

11. The driving assist method as set forth in claim 4, wherein when the host vehicle passes through the lane disappearance region to reach a lane disappearance end point with the steering wheel assist deactivation mode selected and lane recognition is resumed, the mode transition is performed from the steering wheel assist deactivation mode to the hands-on mode; and when a hands-off condition is met during lane-keeping travel in the hands-on mode, the mode transition is performed from the hands-on mode to the hands-off mode.

12. The driving assist method as set forth in claim 4, wherein the lane disappearance region is an exit location for which map data includes no lane information.

13. The driving assist method as set forth in claim 4, wherein the lane disappearance region is a toll plaza for which map data includes information that there are no lanes.

14. The driving assist method as set forth in claim 4, wherein the lane disappearance region is a laneless segment for which map data includes information that there are no lanes.

15. The driving assist method as set forth in claim 4, wherein the lane disappearance region is a merge location for which map data includes information that the current lane will disappear due to merging.

16. The driving assist method as set forth in claim 4, wherein the lane disappearance region is a lane decrease location for which map data includes information that the current lane will disappear due to a lane decrease.

17. A driving assist device that includes a vehicle speed/headway control function and a lane-keeping function as driving assist functions to assist driving operations by a driver, and that is provided with a mode transition controller for transitioning between driving assist modes, the driving assist device comprising:

the driving assist modes including a hands-off mode in which the driver is allowed to take their hands off a steering wheel, a hands-on mode that includes as a condition that the driver has their hands on the steering wheel, a steering wheel operation mode that encourages the driver to perform steering wheel operations, and a steering wheel assist deactivation mode in which the lane-keeping function is deactivated; and the mode transition controller being configured to detect a lane disappearance region, in which no lane that continues from a current lane can be recognized, along an extension of a travel route of a host vehicle during lane-keeping travel in which the hands-off mode has been selected, acquire information on a lane disappearance start point when the lane disappearance region is known in advance, and that sets a mode transition position between a host vehicle position and the lane disappearance start point request a mode transition from the hands-off mode to the hands-on mode when the host vehicle reaches the first position, request a mode transition from the hands-on mode to the steering wheel operation mode when the host vehicle reaches the second position, and perform a mode transition from the steering wheel grip mode to the steering wheel assist deactivation mode before the host vehicle reaches the lane disappearance start point when confirmation has been made that the driver has held the steering wheel.

\* \* \* \* \*